(12) United States Patent
Shigiya

(10) Patent No.: US 12,307,647 B2
(45) Date of Patent: May 20, 2025

(54) CONTROLLER

(71) Applicant: Keyence Corporation, Osaka (JP)

(72) Inventor: Atsuhito Shigiya, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 73 days.

(21) Appl. No.: 18/202,442

(22) Filed: May 26, 2023

(65) Prior Publication Data
US 2023/0421891 A1    Dec. 28, 2023

(30) Foreign Application Priority Data

Jun. 28, 2022  (JP) ................. 2022-103861

(51) Int. Cl.
| | | |
|---|---|---|
| G06T 7/00 | (2017.01) | |
| G06T 7/50 | (2017.01) | |
| H04N 23/60 | (2023.01) | |
| H04N 23/66 | (2023.01) | |
| H04N 23/667 | (2023.01) | |
| H04N 23/90 | (2023.01) | |
| H04N 23/62 | (2023.01) | |

(52) U.S. Cl.
CPC ............. *G06T 7/0004* (2013.01); *G06T 7/50* (2017.01); *H04N 23/64* (2023.01); *H04N 23/66* (2023.01); *H04N 23/667* (2023.01); *H04N 23/90* (2023.01); *G06T 2207/30164* (2013.01); *H04N 23/62* (2023.01)

(58) Field of Classification Search
CPC ...... H04N 23/64; H04N 23/66; H04N 23/667; H04N 23/90; H04N 23/62; G06T 7/0004; G06T 7/50; G06T 2207/30164
See application file for complete search history.

(56) References Cited

U.S. PATENT DOCUMENTS

| | | | | |
|---|---|---|---|---|
| 2003/0193571 A1* | 10/2003 | Schultz | ................ | H04N 23/00 348/207.99 |
| 2009/0027509 A1* | 1/2009 | Giesen | ................ | H04N 23/90 348/211.3 |
| 2015/0355103 A1* | 12/2015 | Ando | ................ | G06T 7/586 348/46 |
| 2019/0279355 A1* | 9/2019 | Waldl | ................ | H04N 23/56 |
| 2019/0304082 A1* | 10/2019 | Tokashiki | ............ | H04L 63/101 |

FOREIGN PATENT DOCUMENTS

JP    2013158889 A    8/2013

OTHER PUBLICATIONS

U.S. Appl. No. 18/202,456, filed May 26, 2023 (110 pages).

* cited by examiner

*Primary Examiner* — John R Schnurr
(74) *Attorney, Agent, or Firm* — Kilyk & Bowersox, P.L.L.C.

(57) ABSTRACT

Provided is a controller capable of cooperating with a smart camera. The controller to which the smart camera is connectable includes a setting unit that receives a setting of one of a first mode in which the smart camera alone executes generation processing of an inspection target image and inspection processing on the inspection target image, and a second mode in which the smart camera executes generation processing of the inspection target image and transfer processing of the inspection target image to the controller, and the controller executes inspection processing on the transferred inspection target image. When the setting of the second mode is received, the inspection unit of the controller executes inspection processing.

12 Claims, 13 Drawing Sheets

CONTROLLER

CROSS-REFERENCE TO RELATED APPLICATIONS

The present application claims foreign priority based on Japanese Patent Application No. 2022-103861, filed Jun. 28, 2022, the contents of which are incorporated herein by reference.

BACKGROUND OF THE INVENTION

1. Field of the Invention

The disclosure relates to a controller to which a smart camera for image inspection can be connected.

2. Description of Related Art

As an image inspection system, a controller type system including a camera that captures an image of a workpiece and a controller to which the camera is connected, the controller executing an inspection on the image captured by the camera has been conventionally known.

Apart from this controller type, recently, there is also a case where a smart camera that does not require a controller and can independently execute imaging to image inspection is used (see, for example, Japanese Patent Application Laid-Open No. 2013-158889).

The smart camera as disclosed in Japanese Patent Application Laid-Open No. 2013-158889 has an advantage that it is not necessary to worry about the installation location of the controller and the wiring is simplified.

On the other hand, with the development of the image inspection technology using artificial intelligence (AI), a situation in which the processing capability is insufficient by the smart camera alone may occur due to the load of inference and learning.

That is, there is assumed a need to switch to the operation of the inspection using the controller in order to enhance the processing capability after the operation of the image inspection is started by the smart camera alone.

For the purpose of enhancing the processing capability, it is conceivable to cope with the increase by adding a smart camera. However, in general, a smart camera is expensive, and a controller is expected to have higher processing capability. Therefore, it may be more effective to introduce a controller instead of adding a smart camera.

However, since the smart camera is a device on the premise that image generation to image inspection are independently executed, it cannot be said that the conventional smart camera is sufficiently assumed to cooperate with the controller particularly with respect to the inspection processing.

SUMMARY OF THE INVENTION

The disclosure has been made in view of such a point, and an object thereof is to provide a controller capable of cooperating with a smart camera.

In order to achieve the above object, according to one embodiment of the disclosure, it can be based on a controller to which a smart camera can be connected. The controller includes a setting unit that receives a setting of one of a first mode in which the smart camera connected to the controller alone executes generation processing of an inspection target image and inspection processing on the inspection target image, and a second mode in which the smart camera connected to the controller executes generation processing of the inspection target image and transfer processing of the inspection target image to the controller, and the controller executes inspection processing on the transferred inspection target image. The controller also includes an inspection unit that executes the inspection processing when the setting unit receives a setting of the second mode.

According to this configuration, when the first mode is set, the smart camera alone executes the processing from the generation processing of the inspection target image to the inspection processing. On the other hand, when the second mode is set, the smart camera executes the generation processing of an inspection target image and transfer processing to the controller, and the controller executes the inspection processing. That is, in a case where the inspection processing can be performed by the smart camera, the inspection processing can be completed by the smart camera alone, and in a case where the processing capability of the smart camera alone is insufficient, the inspection processing can be performed by the controller, so that the smart camera and the controller can be cooperated as necessary.

The setting unit according to another embodiment may be configured to be further capable of receiving a first form of selection in which all of the inspection processing for the inspection target image transferred without executing the inspection processing for the inspection target image generated by one smart camera connected to the controller 10 is executed in the second mode. As a result, since all the inspection processing can be executed by the controller, the smart camera can be dedicated to generation of the inspection target image, and the inspection can be made efficient.

The setting unit according to another embodiment may be configured to be further capable of receiving a second form of selection of executing all of the inspection processing for the plurality of inspection target images transferred without executing the inspection processing for the inspection target images generated by the plurality of smart cameras connected to the controller and executing the comprehensive determination based on the results of the respective inspection processing for the plurality of inspection target images in the second mode. According to this configuration, in addition to allowing the smart camera to concentrate on generation of the inspection target image, the inspection can be efficiently executed even for the inspection target object that needs to be inspected using the plurality of inspection target images.

The setting unit according to another embodiment may be configured to be further capable of receiving a third form of selection in which a part of the inspection processing for the inspection target image generated by one smart camera connected to the controller is executed and the remaining processing of the inspection processing for the inspection target image transferred is executed in the second mode. According to this configuration, even in the time-consuming inspection processing, the inspection on the same inspection target image can be shared by the smart camera and the controller, so that the inspection can be efficiently executed.

The setting unit according to another embodiment may be configured to be further capable of receiving a fourth form of selection in which a part of each inspection processing for the plurality of inspection target images generated by the plurality of smart cameras connected to the controller is executed and the remaining part of each inspection processing for the plurality of inspection target images transferred is executed, and comprehensive determination is executed based on the result of each inspection processing for the plurality of inspection target images in the second mode. According to this configuration, the inspection can be efficiently executed even if the inspection target object requires the inspection using the plurality of inspection target images by the time-consuming inspection processing.

The inspection unit according to another embodiment can acquire an inspection target image generated by the smart camera applying image processing from the smart camera, and executes the inspection processing on the inspection target image after the image processing in the second mode. According to this configuration, the inspection target image subjected to the image processing by the smart camera is subjected to the inspection processing by the controller, so that more complicated image inspection can be efficiently executed.

The inspection unit according to another embodiment can acquire a composite image generated by combining a plurality of captured images by the smart camera from the smart camera, and execute the inspection processing on the composite image in the second mode.

The inspection unit according to another embodiment can acquire three-dimensional shape data generated by the smart camera based on a plurality of captured images from the smart camera, and execute the inspection processing on the three-dimensional shape data in the second mode.

That is, it is possible to concentrate image processing to which a large load is applied, such as synthesis of captured images and generation of three-dimensional shape data, on the smart camera.

In another embodiment, it may be connectable to a plurality of cameras including a normal camera not equipped with an image inspection function. In this case, the inspection unit may execute the inspection processing on the inspection target image acquired from the normal camera, and determine a final result based on a result of the inspection processing and a result of the inspection processing by the smart camera received from the smart camera. According to this configuration, the smart camera independently executes imaging to inspection processing, and the controller executes inspection processing on the inspection target image acquired from the normal camera, and can determine the final result based on both the inspection results. Therefore, the smart camera can be used in a wide range of combinations.

A controller according to another embodiment can be connected to a plurality of cameras including a normal camera not equipped with an image inspection function, and can be configured to be capable of recognizing a type of whether the connected camera is a smart camera or a normal camera. The setting unit may change processing that can be set for the camera according to the recognized type. That is, by recognizing the type of the camera connected to the controller, the processing executable for the camera is set according to the type of the camera, whereby the operability of the user is improved.

As described above, the generation processing to the inspection processing of the inspection target image can be executed by the smart camera alone, and the inspection of the inspection image generated by the smart camera can be executed by the controller as necessary, so that the smart camera and the controller can be linked.

DETAILED DESCRIPTION OF PREFERRED EMBODIMENTS

Hereinafter, embodiments of the invention will be described in detail with reference to the drawings. It is to be noted that the following description of preferred embodiments is merely exemplary in nature and is not intended to limit the invention, its application, or its use.

Figure 1:
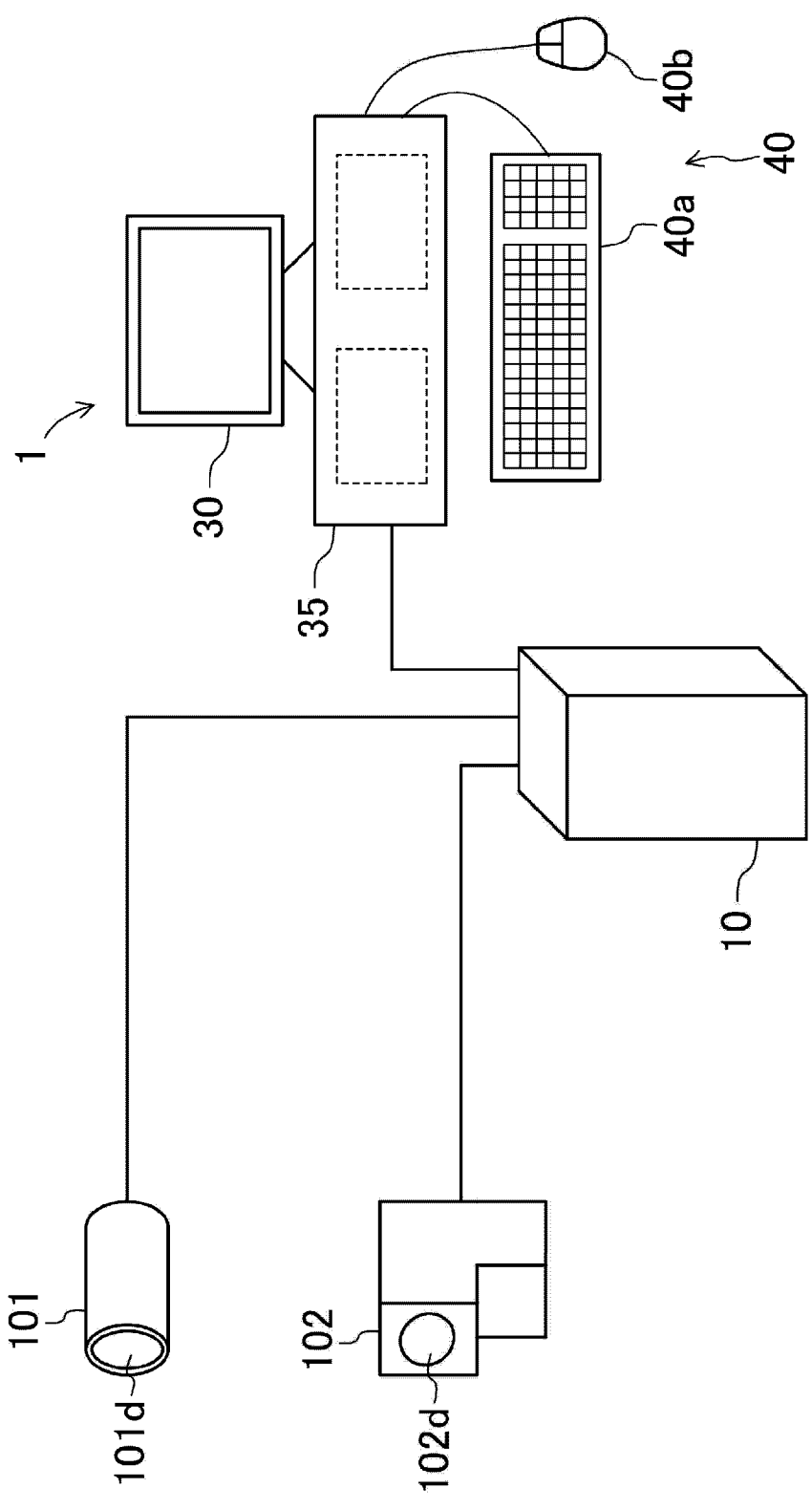
FIG. 1 is a schematic diagram illustrating a configuration of an image inspection system according to an embodiment of the invention.
Figure 2:
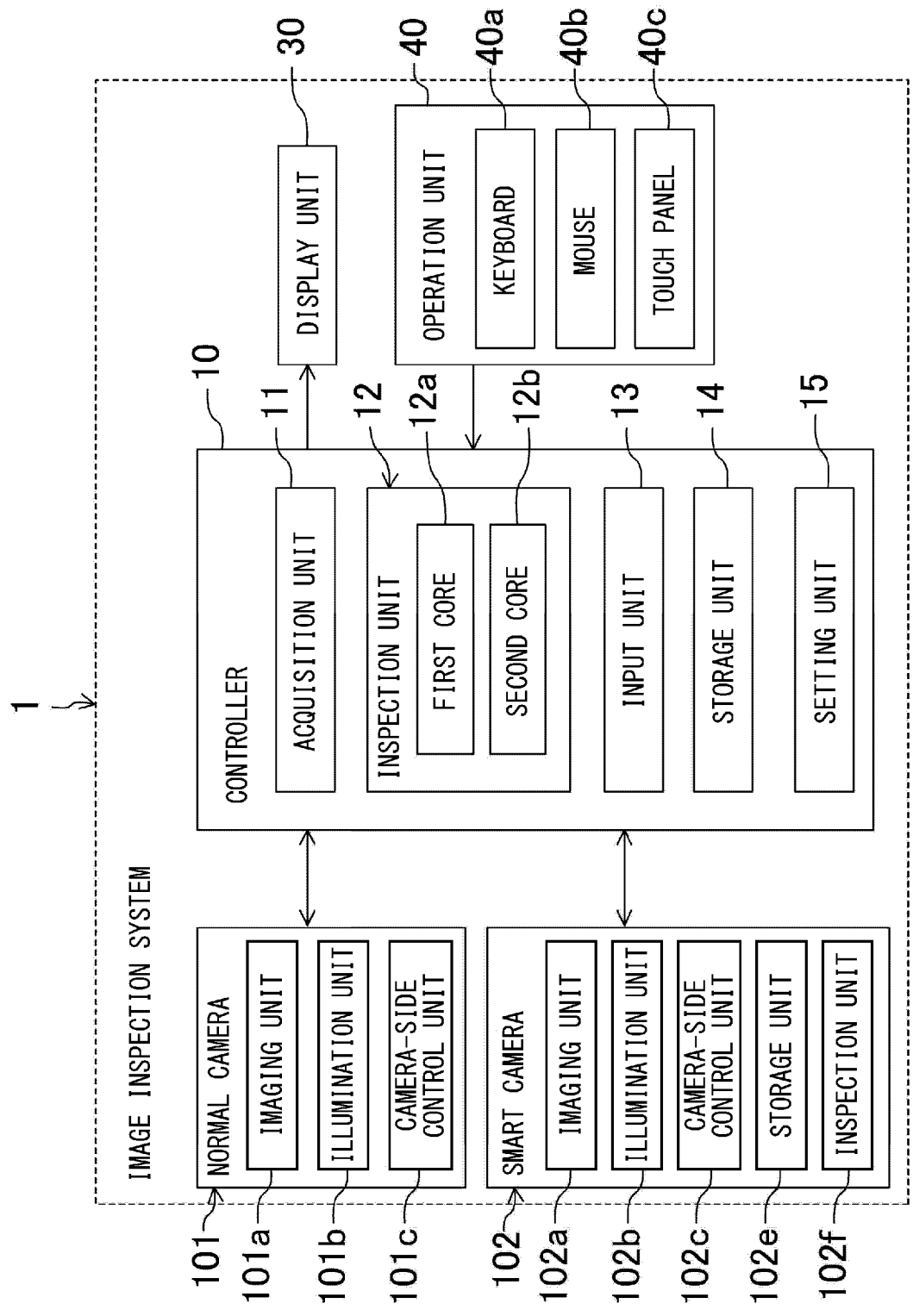
FIG. 2 is a block diagram of the image inspection system.

FIG. 1 is a schematic diagram illustrating a configuration of an image inspection system 1 according to an embodiment of the invention, and FIG. 2 is a block diagram of the image inspection system 1. The image inspection system 1 includes a normal camera 101 having an image generation function, a smart camera 102 that is a camera having an image inspection function in addition to the image generation function, and a controller 10 to which the normal camera 101 and the smart camera 102 can be connected. The image generation function is a function of capturing an image of a workpiece (also referred to as an inspection target) to generate an inspection target image. The image inspection function is a function capable of executing one or a plurality of types of inspection processing on an inspection target image, and is not mounted on the normal camera 101. That is, the normal camera means a camera not equipped with an image inspection function. The image inspection function is mounted not only on the smart camera 102 but also on the controller 10.

The image inspection system 1 is a system that inspects a workpiece captured by the normal camera 101 or the smart camera 102. The normal camera 101 and the smart camera 102 are installed, for example, on a line or the like on which a plurality of workpieces are sequentially conveyed, and can sequentially image the conveyed workpieces.

Since the image inspection function is not installed in the normal camera 101, the inspection of the inspection target image generated by the normal camera 101 is executed by the image inspection function of the controller 10. On the other hand, since the image inspection function is equipped in the smart camera 102, the inspection of the inspection target image generated by the smart camera 102 can be executed by the smart camera 102. As will be described later, all or part of the inspection of the inspection target image generated by the smart camera 102 may be executed by the image inspection function of the controller 10.

Although FIGS. 1 and 2 illustrate an operation mode in which one normal camera 101 and one smart camera 102 are simultaneously connected to the controller 10, the number of connected cameras is not limited thereto, and an operation mode in which a plurality of normal cameras 101 and a plurality of smart cameras 102 are simultaneously connected to the controller 10 can also be adopted.

It is also possible to adopt an operation mode in which one or more normal cameras 101 are connected to the controller 10 and the smart camera 102 is not connected to the controller 10, or an operation mode in which one or more smart cameras 102 are connected to the controller 10 and the normal camera 101 is not connected to the controller 10.

Since the smart camera 102 can independently execute the inspection of the inspection target image, it can be used without being connected to the controller 10. For example, in a case where there is one line on which the workpiece is conveyed and only one portion of the workpiece needs to be inspected, no particular problem occurs by introducing one smart camera 102 to the site and operating without introducing the controller 10.

However, with the development of the image inspection technology using artificial intelligence (AI), a situation in which the processing capability is insufficient by the smart camera 102 alone may occur due to the load of inference and learning. That is, there is assumed a need to switch to the operation of the inspection using the controller 10 in order to enhance the processing capability after the operation of the image inspection is started by the smart camera 102 alone.

In addition, after the introduction of the smart camera 102, in a case where it is desired to increase the number of lines or to simultaneously inspect a plurality of portions of the workpiece, it is necessary to additionally introduce a plurality of cameras in order to enhance processing capability. At this time, it is conceivable to introduce a plurality of smart cameras 102, but since the smart camera 102 is equipped with the image inspection function, the cost is high, and the cost required for introducing the plurality of smart cameras is high. Therefore, it is conceivable to enhance the processing capability by introducing a plurality of inexpensive normal cameras 101. Since the normal camera 101 is not equipped with the image inspection function, it is assumed that the normal camera is introduced together with the controller 10. However, since a plurality of normal cameras 101 can be connected to the controller 10, and the image generated by each normal camera 101 can be inspected at high speed, the number of introduced controllers 10 can be reduced, and the introduction cost as a whole can be reduced as compared with a case where a plurality of smart cameras 102 are introduced.

When the normal camera 101 and the controller 10 are introduced later, a problem arises in that it is necessary to newly make the inspection setting on the controller 10 side when the inspection using the newly introduced normal camera 101 is to be executed by the controller 10, which takes time and effort. The image inspection system 1 according to the present embodiment has a function capable of solving this problem. Hereinafter, the configuration of each of the cameras 101 and 102 and the configuration of the controller 10 will be specifically described.

(Configuration of Normal Camera)

As illustrated in FIG. 2, the normal camera 101 includes an imaging unit 101a and an illumination unit 101b. The imaging unit 101a includes, for example, an image sensor including a charge coupled device (CCD), a complementary metal oxide semiconductor (CMOS), or the like, but may be any image sensor capable of capturing a workpiece. The illumination unit 101b is a portion that illuminates the workpiece at the time of capturing an image by the imaging unit 101a, and includes, for example, a light emitting body such as a light emitting diode. Further, as illustrated in FIG. 1, the normal camera 101 is provided with an optical system 101d including a lens on which light reflected from a workpiece enters.

The imaging unit 101a and the illumination unit 101b are controlled by a camera-side control unit 101c built in the normal camera 101. For example, when a trigger signal is input from the outside, the camera-side control unit 101c controls the imaging unit 101a and the illumination unit 101b according to preset capturing setting, the illumination unit 101b illuminates the workpiece at a predetermined timing, and the imaging unit 101a captures an image of the illuminated workpiece with a predetermined exposure time. The light amount of the illumination unit 101b, the gain of the imaging unit 101a, and the like are defined by capturing settings. Note that the camera-side control unit 101c may be built in a device other than the normal camera 101, for example, the controller 10. Further, the illumination unit 101b may be separated from the normal camera 101, and may be configured to illuminate the workpiece from a place different from the imaging unit 101a. In this case, the control of the illumination unit 101b can be performed by the controller 10.

Further, the camera-side control unit 101c generates an inspection target image by executing various processing such as preprocessing on the image acquired by the imaging unit 101a. Therefore, the image generation function of the normal camera 101 includes the imaging unit 101a and the camera-side control unit 101c. The inspection target image generated by the image generation function of the normal camera 101 is output to the controller 10 via a signal line. Note that the portion that controls the imaging unit 101a and the portion that executes various types of processing on the image acquired by the imaging unit 101a may be configured separately. The image acquired by the imaging unit 101a may be output to the controller 10 as it is. In this case, the image generation function of the normal camera 101 is configured by the imaging unit 101a.

(Configuration of Smart Camera)

The smart camera 102 includes an imaging unit 102a, an illumination unit 102b, a camera-side control unit 102c, and an optical system 102d. The imaging unit 102a and the illumination unit 102b of the smart camera 102 are configured similarly to the imaging unit 101a and the illumination unit 101b of the normal camera 101. Therefore, the image generation function of the smart camera 102 includes the imaging unit 102*a* and the camera-side control unit 102*c*. The camera-side control unit 102*c* and the optical system 102*d* of the smart camera 102 are configured similarly to the camera-side control unit 101*c* and the optical system 101*d* of the normal camera 101.

The image generation function of the smart camera 102 includes a function capable of processing an acquired image into an image suitable for image inspection to improve performance of the image inspection and reduce a processing load. For example, the image generation function of the smart camera 102 also includes a function of realizing processing of edge information into an enhanced image by a Sobel filter and processing of a defective portion to be inspected into an enhanced image based on information learned in advance.

The image generation function of the smart camera 102 also includes image synthesis processing. For example, it is also possible to execute processing of acquiring a plurality of images having different imaging conditions and combining the images to process the images into an image suitable for image inspection. Specifically, it is a function of generating a high dynamic range image by acquiring a plurality of images by changing the exposure time and combining the images, or a function of generating an image in which a defective portion of an inspection target is emphasized by combining a plurality of images acquired under different illumination conditions (light amount of illumination, wavelength of light, illumination direction, etc.). The defective portion is, for example, a flaw.

The image generation function of the smart camera 102 also includes ROI processing of cutting out a part of the acquired image. For example, the processing is processing of cutting out a part of the acquired image based on pixel position information set in advance, or processing of searching the position of the inspection target from the acquired image and cutting out an image of a portion in which the inspection target appears.

The smart camera 102 also includes a storage unit 102*e* and an inspection unit 102*f*. The storage unit 102*e* is a portion that stores a first environment setting related to the hardware of the smart camera 102 and the first inspection setting for the image captured by the smart camera 102. The first environment setting has a role of absorbing a difference in hardware between the hardware of the smart camera 102 and the first inspection setting, and the first environment setting is also different when the hardware is different.

The first environment settings include settings of input/output terminals included in hardware of the smart camera 102, network settings, industrial Ethernet settings such as a data size, a camera name, account settings, and the like. Further, the network settings include IP address settings and FTP server settings as output destinations of output settings. Examples of the industrial Ethernet include EtherNet/IP, PROFINET, and EtherCAT. In addition, the account setting includes a password of the administrator authority and propriety of each operation with the operator authority (propriety of inspection setting switching, propriety of inspection setting saving, and the like). Further, the correspondence relationship between the input/output terminals included in the hardware of the smart camera 102 and the information regarding the signal received from the outside via the terminal is included in the first environment setting.

On the other hand, the first inspection setting does not depend on the hardware of the smart camera 102, and includes only the setting for the inspection. Therefore, even if the hardware is different, the first inspection setting may be the same. The first inspection setting includes an imaging setting tool related to the capturing setting of the camera, a positioning setting tool related to the positioning setting for positioning the inspection region with respect to the inspection target image captured by the camera, an inspection setting tool related to the inspection setting for setting the inspection content with respect to the positioned inspection region, an output tool related to the output setting for performing the setting related to the output of the inspection result, an operation screen setting, and the like. The positioning setting tool is executed after the imaging setting tool, the inspection setting tool is executed after the positioning setting tool, and the output tool is executed after the inspection setting tool.

The imaging setting tool includes a first imaging condition of the smart camera 102. Further, the imaging setting tool also includes a first capturing setting related to the capturing setting of the smart camera 102, and the first capturing setting is stored in the storage unit 102*e* of the smart camera 102.

In a case where a plurality of cameras is connected to the controller 10, the imaging setting tool can include a camera designation parameter for designating any one of the plurality of cameras connected to the controller 10. The camera designation parameter makes it possible to designate a specific camera.

When the smart camera 102 acquires a second inspection setting from the controller 10 to be described later, the storage unit 102*e* stores the second inspection setting acquired from the controller 10. The second inspection setting is an inspection setting for an image captured by a camera connected to the controller 10, and is stored in a storage unit 14 of the controller 10.

The inspection unit 102*f* of the smart camera 102 may be configured by hardware or a combination of hardware and software. The inspection unit 102*f* acquires the first inspection setting stored in the storage unit 102*e* and executes inspection based on the first inspection setting. Specifically, after executing the positioning processing of the inspection region with respect to the inspection target image generated by the smart camera 102, the inspection unit 102*f* executes inspection processing with the inspection content set in advance with respect to the positioned inspection region, and executes the output processing of outputting the inspection result to the outside. In the positioning processing by the inspection unit 102*f*, a preset positioning setting is used. For example, when only a part of the workpiece is to be inspected, information for specifying the relative position and size of the inspection target region in the workpiece is included in the positioning setting. The positioning setting also includes processing of extracting an inspection target region, processing of rotating the inspection target region so that the inspection target region has a desired posture and enlarging or reducing the inspection target region so that the inspection target region has a desired size, and the like.

In the inspection processing by the inspection unit 102*f*, preset inspection setting is used. The inspection setting includes inspection contents for the positioned inspection region. As a specific example, inspection contents such as the presence or absence of a component assembled to a workpiece, the presence or absence of a flaw, whether a dimension is within a reference dimension, and the presence or absence of printing are included.

In the output processing by the inspection unit 102*f*, preset output setting is used. The output setting includes settings related to the output of the inspection result, such as data to be output (whether to output the inspection target image, and the like), an output destination of the inspection result, an output timing, and the like.

The smart camera 102 is configured to be capable of automatically detecting whether it is connected to the controller 10. That is, for example, in a case where the smart camera 102 is connected to the controller 10 via the industrial Ethernet, the smart camera 102 is configured to determine whether the controller 10 is connected to the industrial Ethernet of the smart camera 102, and when it is detected that the connection is made to the controller 10 based on the determination result, it is possible to execute only image generation without executing the image inspection function. In this case, the smart camera 102 operates like the normal camera 101. Note that the smart camera 102 may be operated like the normal camera 101 by user setting.

(Configuration of Controller and Peripheral Device)

A display unit 30 and an operation unit 40 are connected to the controller 10. The display unit 30 and the operation unit 40 constitute the image inspection system 1. The display unit 30 includes, for example, a liquid crystal display device, an organic EL display device, or the like, and is controlled by the controller 10. The display unit 30 displays, for example, a display image generated by the controller an inspection target image generated by the normal camera 101 and the smart camera 102, an inspection result, and the like.

The operation unit 40 includes an operation device or the like for the user to perform various input operations. When the operation unit 40 is operated, the operation content is detected by an input unit 13 of the controller 10. The operation unit 40 includes, for example, a keyboard 40a, a mouse 40b, a touch panel 40c, and the like. The touch panel 40c is configured to be capable of detecting a touch operation by the user. The touch panel 40c and the display unit 30 may be integrated, and in this case, for example, the user interface displayed on the display unit 30 may be directly operated by the touch panel 40c.

The image inspection system 1 may include a personal computer (hereinafter, referred to as PC) 35 illustrated only in FIG. 1. When the PC 35 is included, the display unit 30 and the operation unit 40 may be connected to a main body portion of the PC 35. In this case, the display unit 30 is controlled via the main body portion of the PC 35, and the operation state of the operation unit 40 is acquired by the controller 10 via the main body portion of the PC 35.

When the PC 35 is included, only a part or all of the functions of the controller 10 may be executable by the PC 35. That is, since only a part or all of the functions of the controller 10 are parts that can be configured by a central processing unit (CPU), a ROM, a RAM, and the like built in the PC 35, the functions of the controller 10 can be executed by a device other than the controller 10.

The controller 10 includes an acquisition unit 11 that acquires an image captured by the smart camera 102 or the normal camera 101 connected to the controller 10, an inspection unit 12, an input unit 13, a storage unit 14, and a setting unit 15. The storage unit 14 includes, for example, a solid state drive, a hard disk drive, or the like. The storage unit 14 may be provided in the PC 35, and in this case, various data can be stored as in the case of being provided in the controller 10. Further, the storage unit 14 may include an external storage device connected to the controller 10 or the PC 35 via a network.

The acquisition unit 11, the inspection unit 12, the input unit 13, and the setting unit 15 may be configured by hardware, or may be configured by a combination of hardware and software. For example, a CPU is built in the controller 10. The CPU is connected to a ROM, a RAM, and the like, processes a given signal or data, performs various calculations, and outputs a calculation result. The acquisition unit 11, the inspection unit 12, the input unit 13, and the setting unit 15 may be configured by a CPU, a ROM, a RAM, and the like capable of executing such operations. In addition, each of the acquisition unit 11, the inspection unit 12, the input unit 13, and the setting unit 15 may be configured by an independent arithmetic processing device.

The acquisition unit 11 also acquires the first inspection setting set in the smart camera 102 in addition to the inspection target image generated by the smart camera 102. The first inspection setting acquired by the acquisition unit 11 from the smart camera 102 is stored in the storage unit 14. The storage unit 14 also stores the second inspection setting for an image captured by the normal camera 101 or the smart camera 102 connected to the controller 10.

Further, the storage unit 14 also stores a second environment setting related to hardware of the controller 10. The second environment setting has a role of absorbing a difference in hardware, and includes items similar to the first environment setting regarding hardware of the smart camera 102. That is, the second environment settings include settings of input/output terminals included in hardware of the controller 10, network settings, industrial Ethernet settings such as a data size, a camera name, account settings, and the like. In addition, the correspondence relationship between the input/output terminals included in the hardware of the controller 10 and the information regarding the signal received from the outside via the terminal is included in the second environment setting.

The inspection unit 12 of the controller 10 is a portion that executes an inspection based on the first inspection setting on the image acquired by the acquisition unit 11. When the acquisition unit 11 acquires the inspection target image from the normal camera 101, the inspection unit 12 executes inspection based on the first inspection setting on the inspection target image acquired from the normal camera 101. The inspection unit 12 of the controller 10 is configured to be capable of executing at least the same processing as the inspection unit 102f of the smart camera 102. In the present embodiment, the inspection unit 12 of the controller 10 has higher processing performance than the inspection unit 102f of the smart camera 102, and complex processing can be completed at high speed. In the inspection unit 12 of the controller 10, for example, inference processing using AI and the like can also be processed at high speed.

When the acquisition unit 11 acquires the inspection target image from the smart camera 102, the inspection unit 12 can also execute the inspection based on the first inspection setting on the inspection target image acquired from the smart camera 102. In the present embodiment, as described above, when the smart camera 102 is detected to be connected to the controller 10, only the generation of the inspection target image can be executed without executing the image inspection function. Therefore, the inspection unit 12 of the controller 10 executes inspection on the image generated by the smart camera 102 connected to the controller 10 based on the first inspection setting. When the second inspection setting is stored in the storage unit 14, the inspection unit 12 executes inspection based on the second inspection setting on the image generated by the smart camera 102. As a result, since the second inspection setting on the controller 10 side can be used in the smart camera 102, switching from the operation using the controller 10 to the independent operation of the smart camera 102 can be easily performed.

In the present embodiment, the inspection unit 12 of the controller 10 includes a plurality of cores. In a case where a plurality of cameras (the normal camera 101 and/or the smart camera 102) are connected to the controller 10, each core constituting the plurality of cores is allocated to each camera of the plurality of cameras connected to the controller 10, and the inspection based on the first inspection setting is executed on the image generated by the corresponding camera. FIG. 2 illustrates an example in which the inspection unit 12 includes a first core 12a and a second core 12b. In this example, when the first camera and the second camera are connected to the controller 10, the first core 12a is allocated to the first camera, and the inspection based on the first inspection setting is executed on the image generated by the corresponding first camera, and the second core 12b is allocated to the second camera, and the inspection based on the first inspection setting is executed on the image generated by the corresponding second camera. The number of cores may be three or more, and the number of cameras connected to the controller 10 may also be three or more. As described above, by allocating each core of the multi-core to each camera, jitter (fluctuation of signal waveform) between the cores can be suppressed.

The smart camera 102 is often a camera with higher performance than the normal camera 101, and even under imaging conditions that can be executed by the smart camera 102, the imaging conditions may not be executed by the normal camera 101. Correspondingly, when the normal camera 101 cannot reproduce the parameter value included in the first imaging condition of the smart camera 102, the inspection unit 12 of the controller 10 generates a second imaging condition in which the parameter value is corrected, and executes inspection on the image generated by the normal camera 101 based on the inspection setting in which the first imaging condition of the first inspection setting is replaced with the second imaging condition.

That is, the inspection unit 12 reads the parameter value executable by the normal camera 101, and compares the parameter value included in the first imaging condition of the smart camera 102 with the parameter value executable by the normal camera 101. Then, the inspection unit 12 determines whether the normal camera 101 can reproduce the parameter value included in the first imaging condition of the smart camera 102. When it is determined that the normal camera 101 can reproduce the parameter value included in the first imaging condition of the smart camera 102, the inspection unit 12 executes inspection on the image generated by the normal camera 101 under the first imaging condition of the smart camera 102. On the other hand, when it is determined that the normal camera 101 cannot reproduce the parameter value included in the first imaging condition of the smart camera 102, the inspection unit 12 executes inspection on the image generated by the normal camera 101 under the second imaging condition corrected to the parameter value that can be supported by the normal camera 101.

For example, the smart camera 102 may have a zoom function, but the normal camera 101 may not have a zoom function. In such a case, among the parameter values of the smart camera 102, the parameter values that can be reproduced by the normal camera 101 are exposure time, gain, ROI, and the like.

On the other hand, among the parameter values of the smart camera 102 having a zoom function, the parameter values that cannot be reproduced by the normal camera 101 include a zoom lens position, a focus lens position, a down scaling coefficient, and the like. Downscaling refers to processing of lowering pixel resolution of a target image. For example, it is possible to generate an inspection target image having a smaller number of pixels than a captured image by executing downscaling on the captured image corresponding to an output region that is a region of all or a part of the imaging element.

Further, the first imaging condition of the smart camera 102 may include a function that can be executed only by the smart camera 102, that is, a function that cannot be executed by the normal camera 101. As described above, when the normal camera 101 does not have the function for executing the first imaging condition of the smart camera 102, the inspection unit 12 of the controller 10 invalidates the first imaging condition in the first inspection setting. Examples of the function that cannot be executed by the normal camera 101 include advanced image processing.

When the inspection unit 12 of the controller 10 invalidates the first imaging condition, the invalidation may be output to the outside as error information. For example, by displaying error information on the user interface of the display unit 30, it is possible to notify the user that the first imaging condition has been invalidated.

The input unit 13 is configured to be capable of receiving an input of the second capturing setting related to imaging of the normal camera 101. The user can perform an input operation of the second capturing setting using the operation unit while viewing the user interface displayed on the display unit 30. The input operation of the user is received by the input unit 13 and stored in the storage unit 14 as the second capturing setting. In this case, the inspection unit 12 of the controller 10 executes inspection based on the first inspection setting on the image generated by the normal camera 101 based on the second capturing setting. That is, the inspection setting can be separated from not only the environment setting but also the capturing setting, and the first inspection setting acquired from the smart camera 102 can be applied to the normal camera different from the smart camera 102 that has acquired the inspection setting by separately adding only the capturing setting as the second capturing setting.

When the inspection processing is executed on the inspection target image acquired from the normal camera 101, the inspection unit 12 of the controller 10 can be configured to determine the final result based on the result of the inspection processing and the result of the inspection processing by the smart camera 102 received from the smart camera 102. In this case, if either the result of the inspection processing on the inspection target image acquired from the normal camera 101 or the result of the inspection processing by the smart camera 102 is defective, the final result may be regarded as defective, or if both the result of the inspection processing on the inspection target image acquired from the normal camera 101 and the result of the inspection processing by the smart camera 102 are not good, the final result may not be regarded as good.

(Camera Independent Mode/Camera Interlocking Mode)

The controller 10 is configured to be switchable between a camera independent mode and a camera interlocking mode. The camera independent mode is a mode in which the inspection of the image acquired from each camera is executed based on the inspection setting set for each camera of the plurality of cameras connected to the controller 10. In the camera independent mode, each camera connected to the controller operates independently like a smart camera. The inspection settings can be set separately for each camera, and the setting contents may be different or the same.

On the other hand, the camera interlocking mode is a mode in which the inspection of the image acquired from each camera is executed based on the inspection setting common to the plurality of cameras connected to the controller 10. In the camera interlocking mode, all the cameras connected to the controller 10 operate in cooperation, and the inspection setting is assigned to the controller 10. For example, this can be applied to a case where one workpiece is captured at different angles and by different methods, and inspection is performed on a plurality of images based on a single inspection setting.

The user can select one of the camera independent mode and the camera interlocking mode by operating the operation unit 40. This operation is a mode selection operation. The input unit 13 is configured to be capable of receiving selection of any mode.

When the input unit 13 receives the selection of the camera interlocking mode, the mode of the controller 10 becomes the camera interlocking mode. On the other hand, when the input unit 13 receives the selection of the camera independent mode, the mode of the controller 10 becomes the camera independent mode. This enables a wide range of use.

When the controller 10 is in the camera interlocking mode, the smart camera 102 and the controller 10 cannot use the same inspection setting. This is because the inspection setting in the camera interlocking mode is used by a plurality of cameras, and designation of the camera is required in the imaging setting tool. On the other hand, in the case of inspection in the camera independent mode or the smart camera 102, since there is one imaging unit, it is not necessary to designate a camera in the imaging setting tool.

In response to this, the inspection unit 12 of the controller 10 is configured such that the input unit 13 receives the selection of the camera independent mode, and the first inspection setting acquired from the smart camera 102 can be applied to the image acquired from another camera only when the operation is performed in the camera independent mode.

In addition, the input unit 13 is configured to receive designation of a plurality of cameras connected to the controller 10 via the camera designation parameter of the common inspection setting when receiving the selection of the camera interlocking mode, and on the other hand to receive the inspection setting for each camera when receiving the selection of the camera independent mode. That is, in the camera interlocking mode, a plurality of cameras to be subjected to the camera interlocking mode is designated in the imaging setting tool included in the inspection setting common to the respective cameras. Since designation of the camera is required, it is not possible to use the inspection setting of the smart camera 102 that does not require designation of the camera in the imaging setting tool. However, since the inspection setting is assigned to each camera in the camera independent mode, designation of a camera is not required, and the inspection setting can be shared with the smart camera 102.

Figure 3:
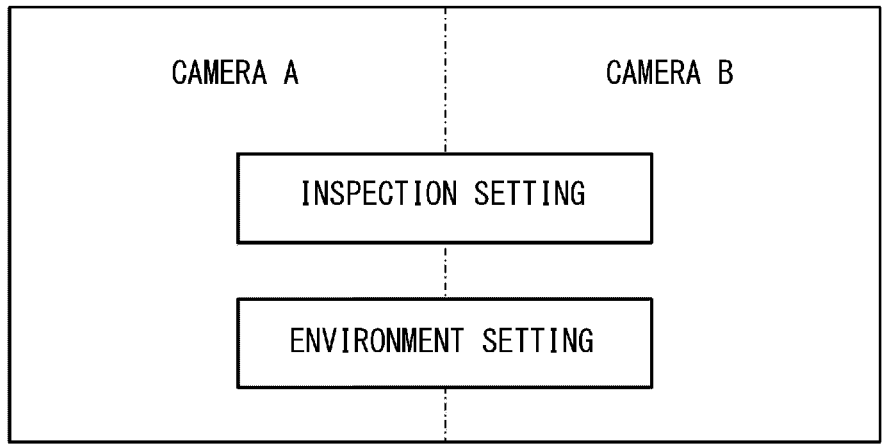
FIG. 3 is a diagram for explaining an outline of a camera interlocking mode.

For example, as FIG. 3 illustrates an outline of the camera interlocking mode, in a case where the camera A and the camera B, which are normal cameras, are connected to the controller 10, both the inspection setting and the environment setting are made common. On the other hand, FIG. 4 illustrates a case where, for example, there are a plurality of lines for executing the same inspection at the site, and the mode of the controller 10 is the camera independent mode.

Figure 4:
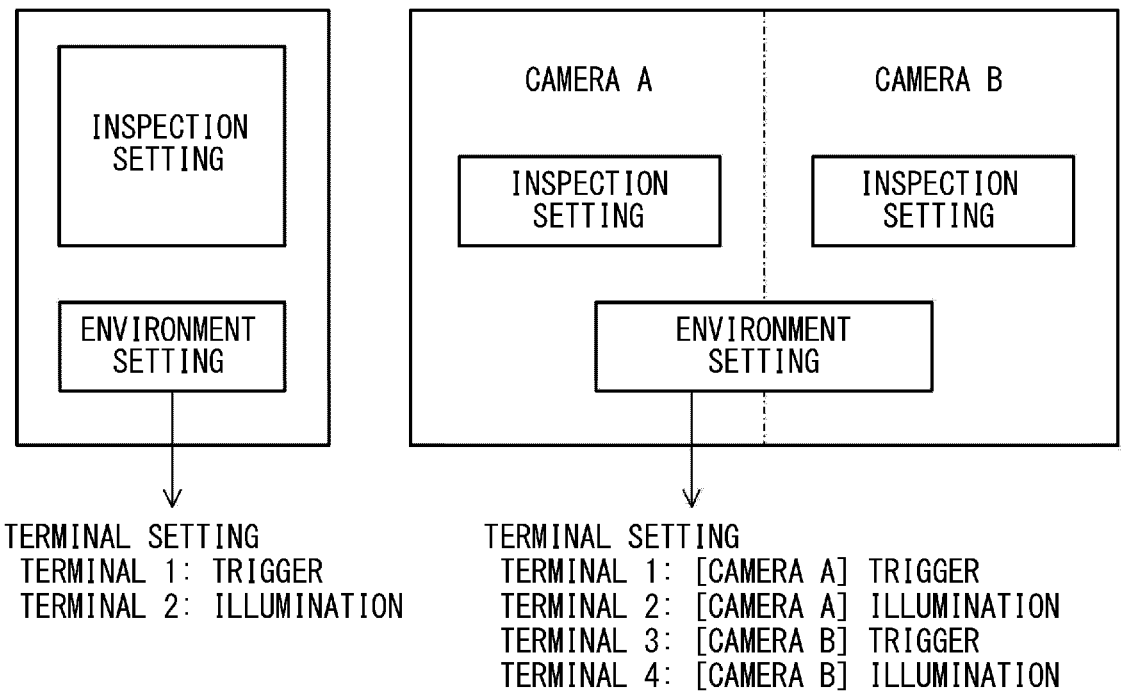
FIG. 4 is a diagram for explaining an outline of a camera independent mode.

In FIG. 4, there are a smart camera 102 and a controller 10 in which a camera A and a camera B, which are normal cameras, are connected, and an inspection setting and an environment setting are stored in the smart camera 102. The inspection setting of the smart camera 102 includes information on whether the imaging is performed by the trigger signal or the periodic imaging regardless of the trigger signal, and also includes information on whether to illuminate the workpiece at the time of imaging. "Terminal 1" of the terminal setting included in the environment setting of the smart camera 102 is a trigger signal as an imaging execution signal, and "terminal 2" is an illumination signal as an illumination execution signal. This relationship is a correspondence relationship between a terminal included in the hardware and information related to a signal received from the outside via the terminal.

The inspection setting of the controller 10 includes information on whether the imaging is performed by the trigger signal or the periodic imaging regardless of the trigger signal, and also includes information on whether the workpiece is illuminated at the time of imaging. "Terminal 1" of the terminal settings included in the environment setting of the controller 10 is a trigger signal as an imaging execution signal for the camera A, "terminal 2" is an illumination signal as an illumination execution signal for the camera A, "terminal 3" is a trigger signal as an imaging execution signal for the camera B, and "terminal 4" is an illumination signal as an illumination execution signal for the camera B. As described above, physical information indicating which terminal receives the imaging execution signal or the illumination signal is included in the environment setting of controller 10. The inspection setting includes information on whether the imaging is performed by the trigger signal or the periodic imaging regardless of the trigger signal, and also includes information on whether the workpiece is illuminated at the time of imaging.

Specific Example 1

Figure 5:
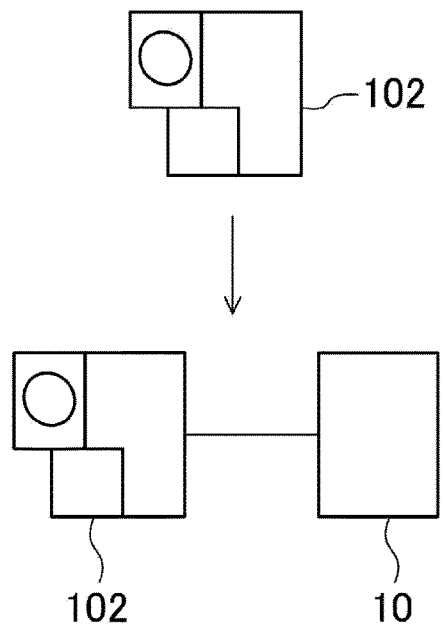
FIG. 5 is a diagram illustrating an example in which an existing smart camera is connected to an added controller.

For example, as illustrated in the upper side of FIG. 5, there is a case where an inspection is executed only by the smart camera 102, but an item to be inspected is added, or a case where an inspection tool is added, the processing time becomes long, and it may not be in takt time for the inspection. On the other hand, the controller 10 has higher processing capability than the smart camera 102. Therefore, as illustrated in the lower side of FIG. 5, the controller 10 is added in addition to the existing smart camera 102 to cope with this.

In this case, the existing smart camera 102 is connected to the controller 10, and the acquisition unit 11 of the controller 10 acquires the first inspection setting used in the smart camera 102 and stores the first inspection setting in the storage unit 14. The inspection unit 12 of the controller 10 executes an inspection based on the first inspection setting on the image generated by the smart camera 102. The smart camera 102 connected to the controller 10 does not use the image inspection function, and thus operates as a camera similar to the normal camera 101.

There are at least two methods for acquiring the first inspection settings used in the smart camera 102 by the controller 10. One is a method of transferring the first inspection setting of the smart camera 102 to the controller 10 via the PC and the other is a method of directly transferring the first inspection setting of the smart camera 102 to the controller 10.

Figure 6:
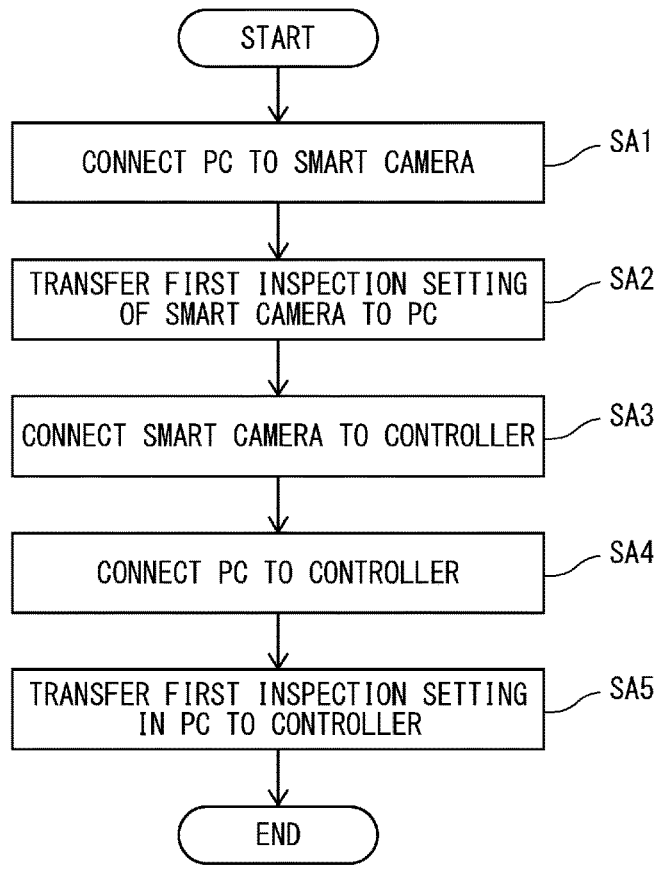
FIG. 6 is a flowchart illustrating an example of a procedure in a case where a first inspection setting of the smart camera is transferred to a controller via a PC.

FIG. 6 is a flowchart illustrating an example of a procedure in a case where the first inspection setting of the smart camera 102 is transferred to the controller via the PC 35. In step SA1 after the start, the PC 35 is connected to the smart camera 102. In step SA2, the first inspection setting of the smart camera 102 is transferred to the PC 35 and temporarily stored in the PC 35. After step SA2, the smart camera 102 is connected to the controller 10 in step SA3. In step SA4, the PC 35 is connected to the controller 10. The order of steps SA3 and SA4 may be opposite or simultaneous. After Step SA4, the first inspection setting stored in the PC 35 is transferred to the controller 10 in Step SA5.

Figure 7:
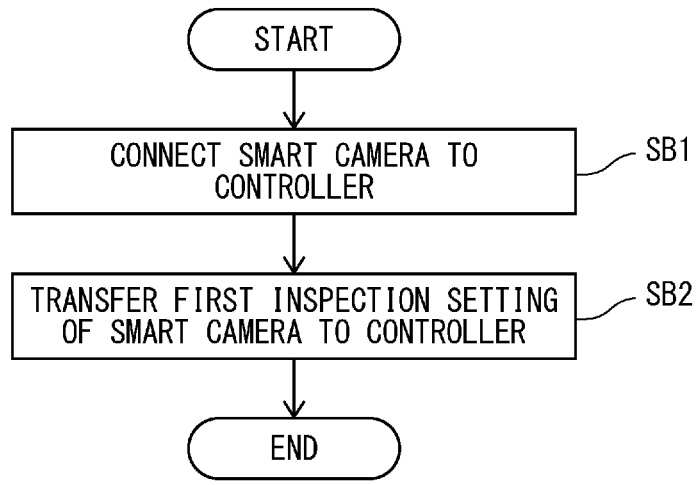
FIG. 7 is a flowchart illustrating an example of a procedure in a case where the first inspection setting of the smart camera is directly transferred to the controller.

FIG. 7 is a flowchart illustrating an example of a procedure in a case where the first inspection setting of the smart camera 102 is directly transferred to the controller 10 without going through the PC 35. In step SB1 after the start, the smart camera 102 is connected to the controller 10. Thereafter, the process proceeds to step SB2, and the first inspection setting of the smart camera 102 is transferred to the controller 10.

Specific Example 2

Figure 8:
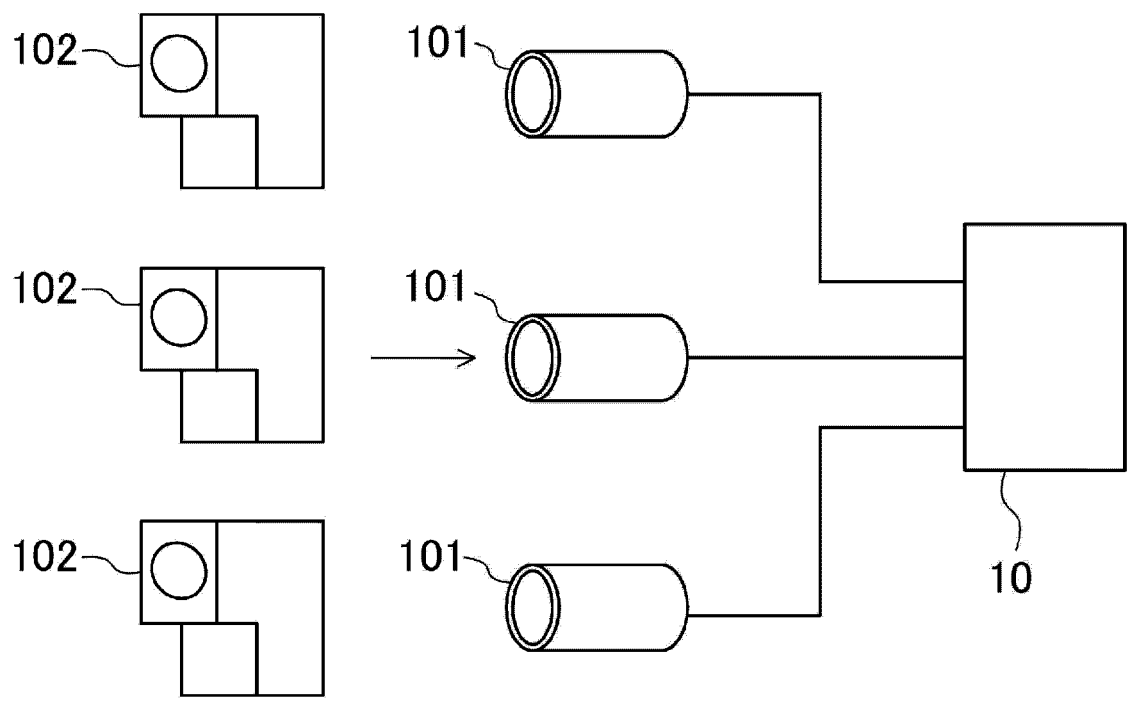
FIG. 8 is a diagram illustrating an example of a system in which a plurality of smart cameras are replaced with the same number of normal cameras.

As illustrated on the left side of FIG. 8, it is assumed that the image inspection system is configured using three smart cameras 102 in a certain line. In a case where an image inspection system capable of executing an inspection equivalent thereto is required on another line, when the image inspection system is constructed at low cost, the expensive smart camera 102 is replaced with the normal camera 101, and the controller 10 is added. As a result, the total cost can be reduced. Note that, in general, there is a cost advantage by replacing two or more smart cameras 102 with a combination of the same number of normal cameras 101 and the same number of controllers 10.

In this case, the existing smart camera 102 is connected to the controller 10, and the acquisition unit 11 of the controller 10 acquires the first inspection setting used in each smart camera 102 and stores the first inspection setting in the storage unit 14. The first inspection settings of the three smart cameras 102 may be different from each other, and in this case, the acquisition unit 11 of the controller 10 acquires the three first inspection settings and stores the three first inspection settings in the storage unit 14. The inspection unit 12 of the controller 10 assigns the corresponding first inspection setting to the image generated by each normal camera 101, and executes inspection based on the assigned first inspection setting.

Figure 9:
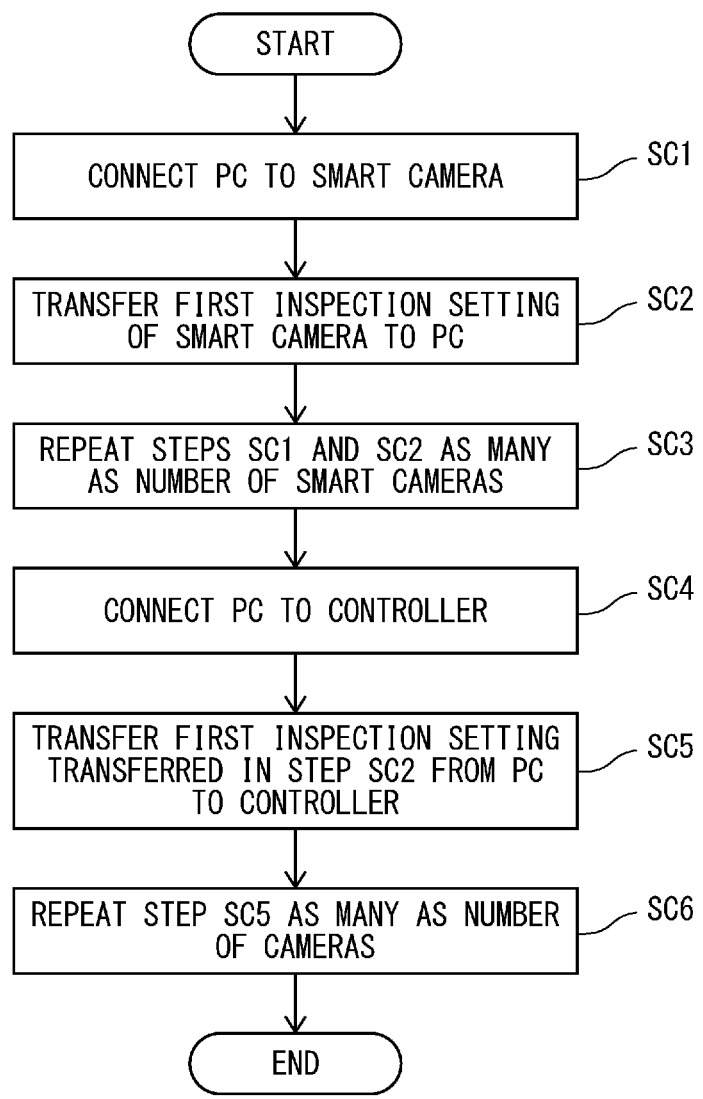
FIG. 9 is a flowchart illustrating an example of a procedure in a case where the first inspection settings of a plurality of smart cameras are transferred to a controller via a PC.

FIG. 9 is a flowchart illustrating an example of a procedure in a case where the first inspection settings of the plurality of smart cameras 102 are transferred to the controller 10 via the PC 35. In step SC1 after the start, the PC 35 is connected to the smart camera 102. In step SC2, the first inspection setting of the smart camera 102 is transferred to the PC 35 and temporarily stored in the PC 35. In step SC3, steps SC1 and SC2 are repeated for the number of smart cameras 102. Consequently, all the first inspection settings of the plurality of smart cameras 102 can be stored in the PC 35.

Thereafter, the process proceeds to step SC4, and the PC 35 is connected to the controller 10. In step SC5, the first inspection setting transferred to the PC 35 in step SC2 is transferred from the PC 35 to the controller 10. In step SC6, step SC5 is repeated for the number of normal cameras 101.

Specific Example 3

Figure 10:
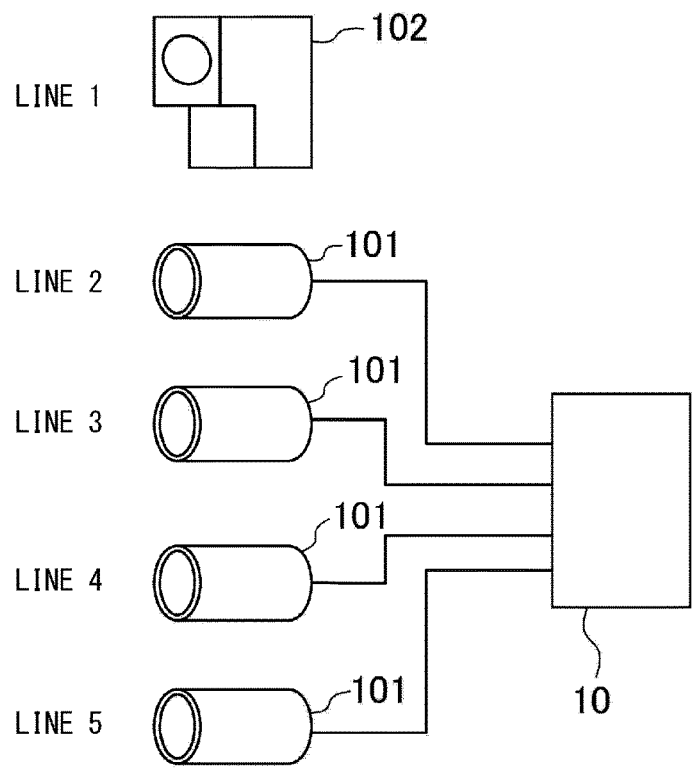
FIG. 10 is a diagram illustrating an example of constructing an image inspection system using both a smart camera and a normal camera.

FIG. 10 illustrates an example in which the image inspection system is constructed using both the smart camera 102 and the normal camera 101. As a premise, it is assumed that the upper limit number of cameras connectable to the controller 10 is 4. There are five lines on which the workpiece is conveyed at the site, and it is necessary to install cameras on the lines 1 to 5. In a case where the controller 10 and the normal camera 101 are used in combination, the number of cameras connectable to the controller 10 is up to 4, and thus one camera is not enough. Although there is also a method of newly introducing the second controller and the normal camera 101, the cost of combining the controller 10 and the normal camera 101 is higher than that of one smart camera 102, so that one smart camera 102 can be combined to cope with the inspection of the lines 1 to 5.

In this case, the acquisition unit 11 of the controller 10 acquires the first inspection setting of the smart camera 102 and stores the first inspection setting in the storage unit 14. The inspection unit 12 of the controller 10 assigns the corresponding first inspection setting to the image generated by each normal camera 101, and executes inspection based on the assigned first inspection setting.

Figure 11:
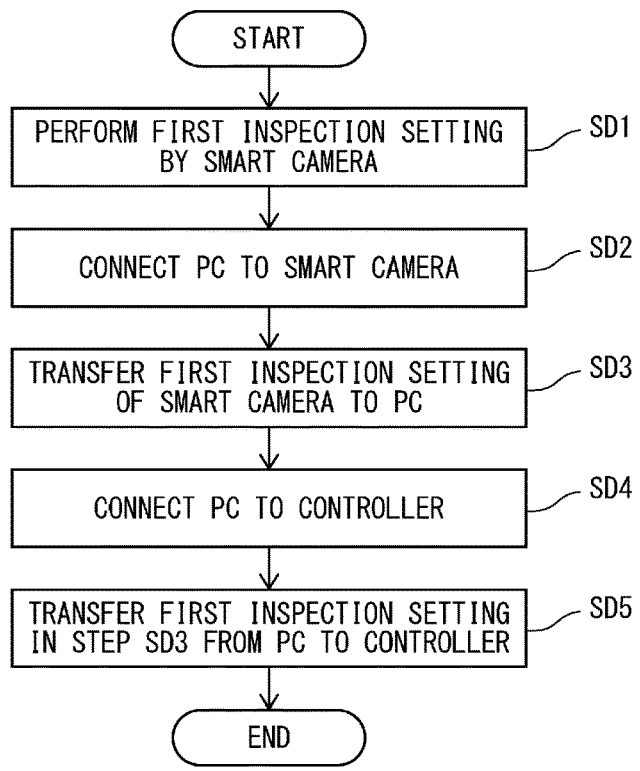
FIG. 11 is a flowchart illustrating an example of a procedure in a case where the first inspection setting set by the smart camera is transferred to the controller.

Specifically, as illustrated in the flowchart of FIG. 11, the smart camera 102 performs the first inspection setting in step SD1 after the start. In step SD2, the PC 35 is connected to the smart camera 102. In step SD3, the first inspection setting of the smart camera 102 is transferred to the PC 35 and stored in the PC 35. In step SD4, the PC 35 is connected to the controller 10. In step SD5, the first inspection setting stored in the PC 35 in step SD3 is transferred from the PC 35 to the controller 10. Note that, although not illustrated, in a case where the inspection setting is performed first by the controller 10, the inspection setting of the controller may be transferred to the smart camera 102, and the inspection may be executed in the inspection processing of the smart camera 102.

Operation Example

Figure 12:
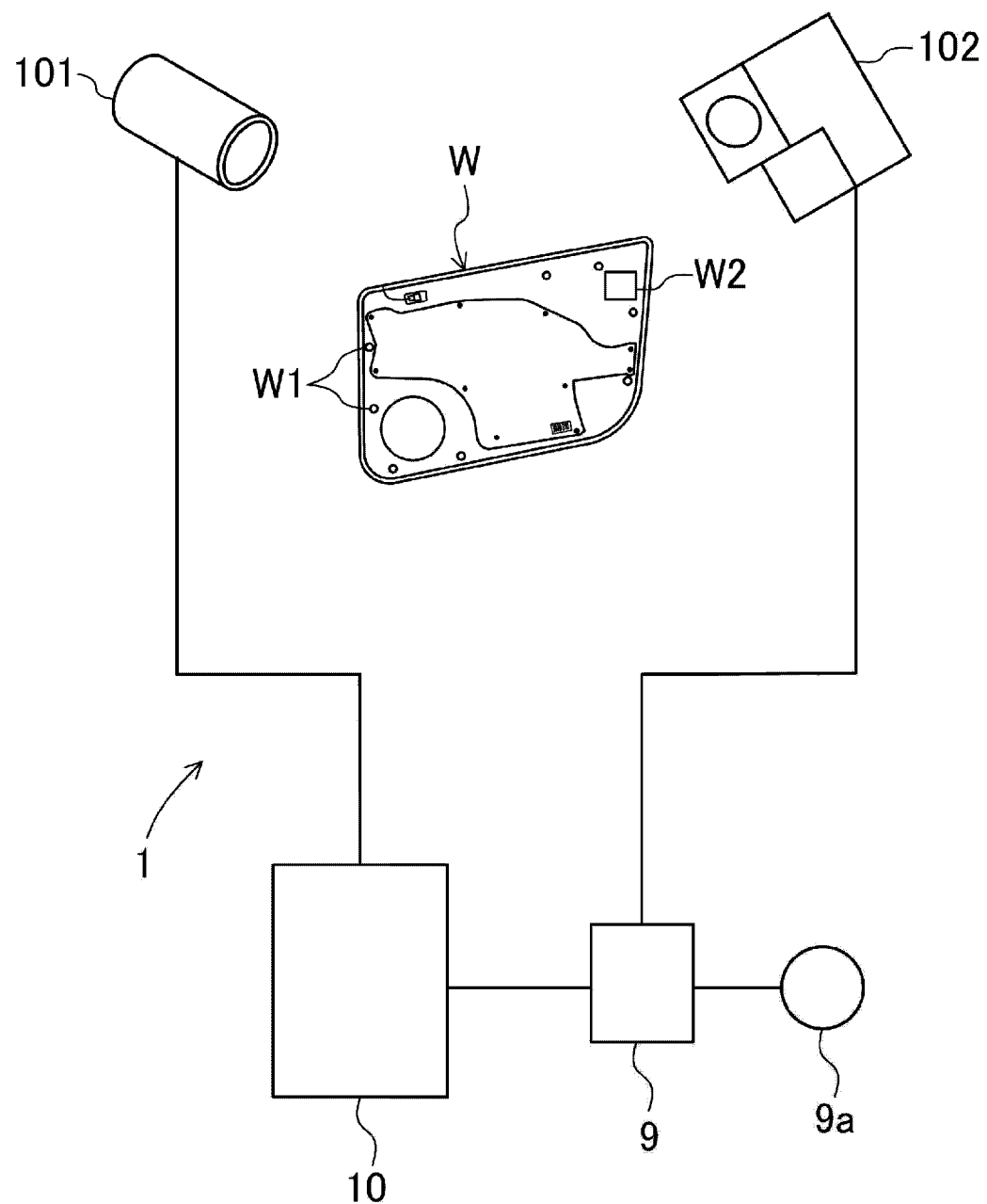
FIG. 12 is a diagram illustrating an operation example of the image inspection system.

FIG. 12 is a diagram illustrating an operation example of the image inspection system 1. The image inspection system 1 includes a normal camera 101 connected to a controller 10 and a smart camera 102 connected to a programmable logic controller (PLC) 9. An inspection start button 9a is connected to the PLC 9.

The first component W1 and the second component W2 are assembled to the workpiece W. The workpiece W in which the first component W1 and the second component W2 are assembled is placed on a placing table (not illustrated) and inspected. The normal camera 101 is a camera for detecting the presence or absence of the first component W1, and the smart camera 102 is a camera for detecting the presence or absence of the second component W2.

When the user operates the inspection start button 9a, a trigger signal is output from the PLC 9 to the controller 10 and the smart camera 102. The normal camera 101 and the smart camera 102 that have received the trigger signal execute imaging processing to generate an inspection target image. The inspection target image generated by the normal camera 101 is inspected by the inspection unit 12 of the controller 10, and the inspection result is output from the controller 10 to the PLC 9. On the other hand, the inspection target image generated by the smart camera 102 is inspected by the inspection unit 102f of the smart camera 102, and the inspection result is output from the smart camera 102 to the PLC 9.

The PLC 9 determines whether the workpiece W is a non-defective product or a defective product by combining the inspection result output from the controller 10 and the inspection result output from the smart camera 102. The determination result is displayed on a display unit (not illustrated) or the like. In the case of a defective product, a defective portion is clearly indicated on the image.

(In-Smart Camera Inspection Mode/In-Controller Inspection Mode)

The controller 10 is configured to be switchable between an in-smart camera inspection mode (first mode) and an in-controller inspection mode (second mode). The in-smart camera inspection mode is a mode in which the smart camera 102 connected to the controller 10 independently executes the generation processing of the inspection target image and the inspection processing on the inspection target image, and the inspection processing on the inspection target image is executed by the inspection unit 102f of the smart camera 102.

On the other hand, in the in-controller inspection mode, the smart camera 102 connected to the controller 10 executes the generation processing of the inspection target image and the transfer processing of the inspection target image to the controller 10, and the controller 10 executes inspection processing on the transferred inspection target image, and the inspection unit 12 of the controller 10 executes inspection processing on the inspection target image.

In the in-controller inspection mode, the inspection unit 12 of the controller can also acquire, from the smart camera 102, an inspection target image generated by applying image processing by the smart camera 102 to an image acquired by the smart camera 102. In this case, the inspection unit 12 of the controller 10 executes inspection processing on the inspection target image after the image processing is performed by the smart camera 102.

In addition, the inspection unit 12 of the controller 10 can acquire, from the smart 102 camera 102, an inspection target image (composite image) generated by combining a plurality of images acquired by the smart camera 102 in the in-controller inspection mode. In this case, the inspection unit 12 of the controller 10 executes inspection processing on the composite image combined by the smart camera 102.

Further, the inspection unit 12 of the controller 10 can acquire three-dimensional shape data generated by the smart camera 102 based on the plurality of captured images from the smart camera 102 in the in-controller inspection mode. The three-dimensional shape data is data constituting an inspection target image, and in this case, the inspection unit 12 of the controller 10 executes inspection processing on the three-dimensional shape data generated by the smart camera 102.

The user can set one of the in-smart camera inspection mode and the in-controller inspection mode by operating the operation unit 40. This operation is a mode setting operation. In addition, the controller 10 may perform setting processing of any one of the in-smart camera inspection mode and the in-controller inspection mode, and in this case, it is mode setting processing. The mode setting operation and the mode setting process are received by the setting unit 15.

When the setting unit 15 receives the setting of the in-smart camera inspection mode, the mode of the controller 10 becomes the in-smart camera inspection mode. On the other hand, when the setting unit 15 receives the selection of the in-controller inspection mode, the mode of the controller 10 becomes the in-controller inspection mode. Therefore, the inspection unit 12 of the controller 10 executes inspection processing on the inspection target image.

When the in-controller inspection mode is set, the setting unit 15 is configured to be further capable of receiving a first form of selection in which all of the inspection processing for the inspection target image transferred without executing the inspection processing for the inspection target image generated by one smart camera 102 connected to the controller 10 is executed. When the first form of selection is received by the setting unit 15, the inspection unit 12 of the controller 10 operates to execute all the inspection processing. That is, a plurality of inspection processing may be set to be executed on the inspection target image, and the load of the processing may be increased in the smart camera 102. In this case, the inspection unit 12 of the controller 10 having higher processing capability than the smart camera 102 executes all the inspection processing, so that the smart camera 102 can concentrate on image generation, and the inspection can be made efficient.

The invention is not limited thereto, and in a case where the plurality of smart cameras 102 is connected to the controller 10, the following can be performed. For example, in a case where the in-controller inspection mode is set, the setting unit 15 may be configured to be further capable of receiving a second form of selection of executing all of the inspection processing for the plurality of inspection target images transferred without executing the inspection processing for the inspection target images generated by the plurality of smart cameras 102 connected to the controller 10 and executing the comprehensive determination based on the results of the respective inspection processing for the plurality of inspection target images. When the second form of selection is received by the setting unit 15, the inspection unit 12 of the controller 10 executes all the inspection processing on the plurality of inspection target images on which the inspection processing is not executed. Then, the inspection unit 12 acquires a plurality of inspection results, and executes comprehensive determination based on a result of each inspection processing. For example, when at least one of the plurality of inspection results is defective, the comprehensive determination is made to be defective, or when all of the plurality of inspection results are not good, the comprehensive determination is not made to be good.

Further, when the in-controller inspection mode is set, the setting unit 15 may be configured to be further capable of receiving a third form of selection in which a part of the inspection processing on the inspection target image generated by one smart camera 102 connected to the controller 10 is executed and the remaining part of the inspection processing on the transferred inspection target image is executed. When the third form of selection is received by the setting unit the inspection unit 12 of the controller 10 executes the remaining part of the inspection processing that has not been executed.

In addition, when the in-controller inspection mode is set, the setting unit may be configured to be further capable of receiving a fourth form of selection in which a part of each inspection processing for the plurality of inspection target images generated by the plurality of smart cameras 102 connected to the controller is executed and the remaining part of each inspection processing for the plurality of inspection target images transferred is executed, and comprehensive determination is executed based on the result of each inspection processing for the plurality of inspection target images. When the fourth form of selection is received by the setting unit 15, the inspection unit 12 of the controller 10 executes the remaining part of the inspection processing on the plurality of inspection target images.

(Selection of Mode)

Figure 13:
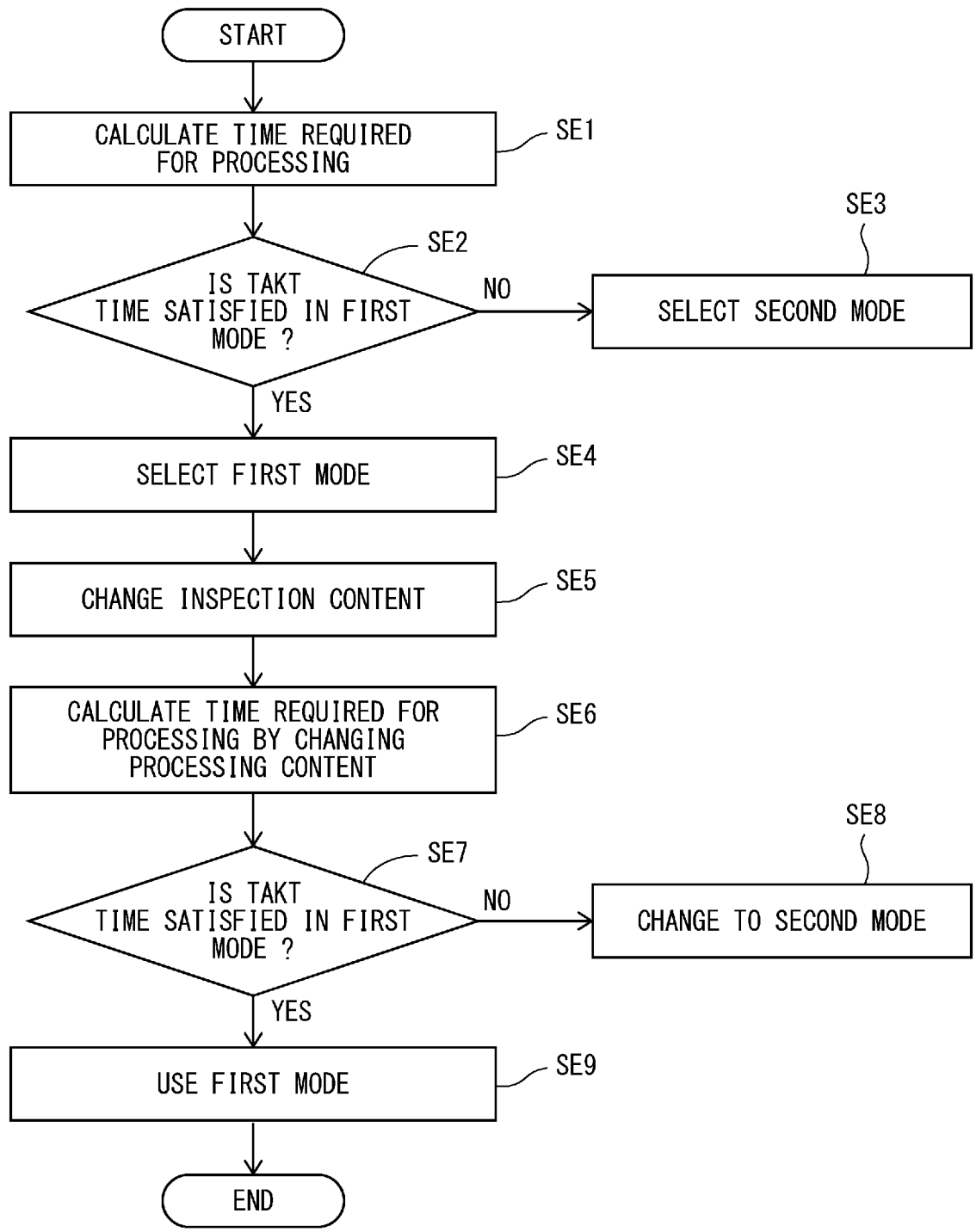
FIG. 13 is a flowchart illustrating an example of a mode selection procedure of the image inspection system.

As described above, the image inspection system 1 according to the present embodiment can freely connect and use the smart camera 102 and the normal camera 101. A mode selection procedure of the image inspection system 1 will be described with reference to a flowchart illustrated in FIG. 13. In step SE1 after the start of the flowchart illustrated in FIG. 13, the time required for the image inspection processing is calculated. In step SE2, it is determined whether the takt time is satisfied in the first mode in which the smart camera executes inspection processing alone. In a case where the takt time is not satisfied in the first mode, the process proceeds to step SE3, and the second mode in which the smart camera and the controller cooperate to execute the inspection processing is selected. In a case where the takt time is satisfied in the first mode, the process proceeds to step SE4, and the first mode is selected.

Step SE5 is a change of the inspection content. For example, in a case where the inspection content is changed due to a change in the workpiece or the like, the process proceeds to step SE6, and the processing content is changed to calculate the time required for the processing. In step SE7, it is determined whether the takt time is satisfied in the first mode. In a case where the takt time is not satisfied in the first mode, the process proceeds to step SE8, and the mode is changed to the second mode. In a case where the takt time is satisfied in the first mode, the process proceeds to step SE9, and the first mode is used as it is.

There is a case where the mode is shifted to the second mode due to insufficient processing performance during operation in the first mode. In this case, the parameter set in the first mode can be easily diverted to the second mode. Examples of the method include a method in which the controller 10 acquires parameters necessary for image inspection from the camera and executes the image inspection.

Figure 14A:
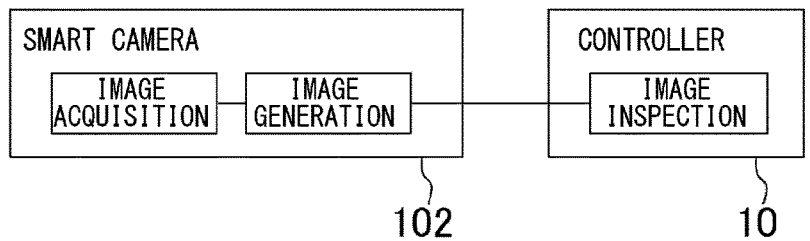
FIGS. 14A to 14D are diagrams for explaining four use forms of a second mode of the image inspection system.

Next, a use form 1, a use form 2, a use form 3, and a use form 4 of the second mode in which the smart camera and the controller cooperate to execute the inspection processing will be described with reference to FIGS. 14A to 14D. FIG. 14A of FIG. 14 shows the use form 1 in which an image is acquired by the smart camera 102, an inspection target image is generated, then the controller 10 acquires the inspection target image, and the inspection unit 12 of the controller 10 executes inspection processing.

Figure 14B:
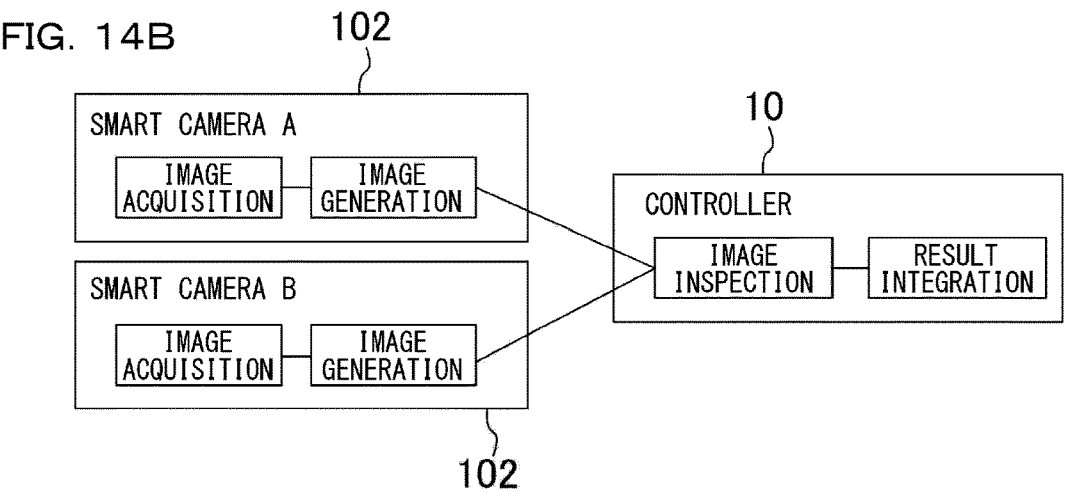

FIG. 14B of FIG. 14 shows the use form 2 in which the smart cameras A and B acquire images, the smart cameras A and B generate inspection target images, the controller 10 acquires a plurality of inspection target images, the inspection unit 12 of the controller 10 executes inspection processing on the plurality of inspection target images, and results are integrated (final result determination).

Figure 14C:
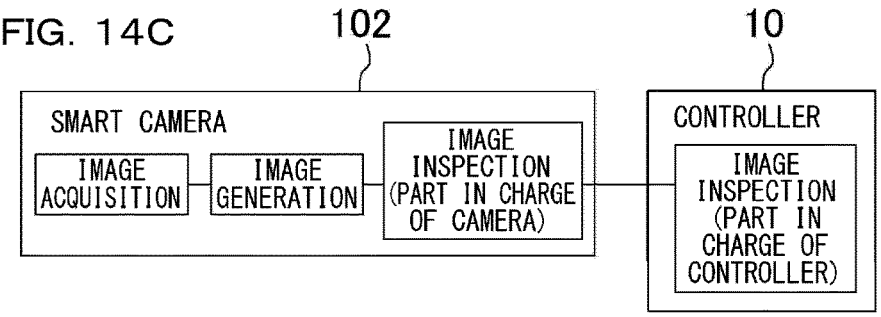

FIG. 14C of FIG. 14 shows the use form 3 in which an image is acquired by the smart camera 102, the smart camera 102 generates an inspection target image, the inspection unit 102*f* executes a part of the inspection processing (the part in charge of the camera), the controller 10 acquires the inspection target image, and the inspection unit 12 of the controller 10 executes the remaining part of the inspection processing (the part in charge of the controller) on the inspection target image.

Figure 14D:
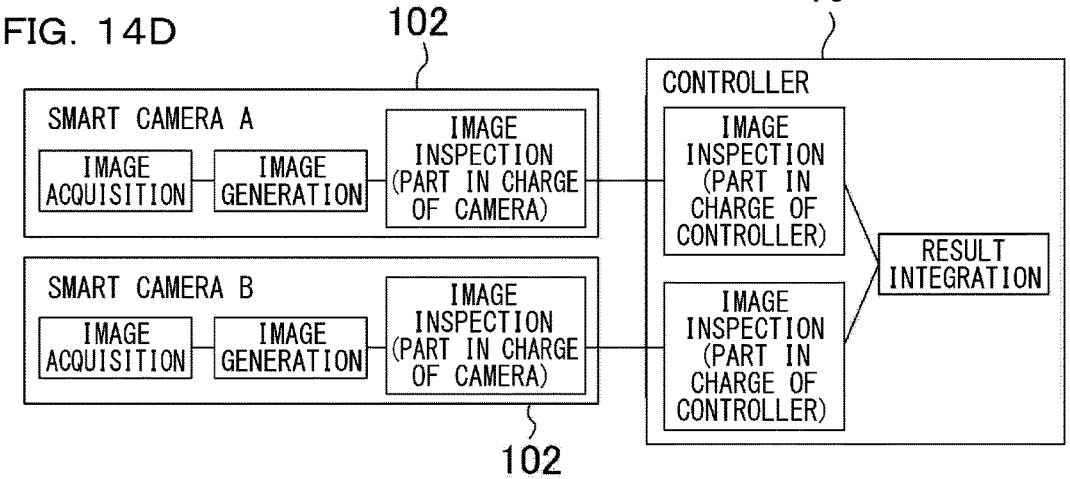

FIG. 14D of FIG. 14 shows the use form 4 in which the smart cameras A and B acquire images, the smart cameras A and B generate inspection target images, the inspection unit 102*f* executes a part of the inspection processing (the part in charge of the camera), the controller 10 acquires a plurality of inspection target images, and the inspection unit 12 of the controller 10 executes the remaining part of the inspection processing (the part in charge of the controller) on each inspection target image.

Operation Example

Figure 15A:
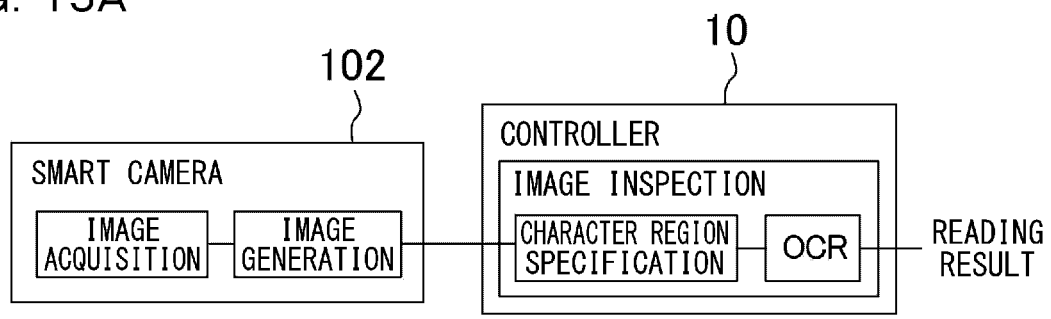
FIGS. 15A and 15B are diagrams for explaining an operation example of the image inspection system.
Figure 15B:
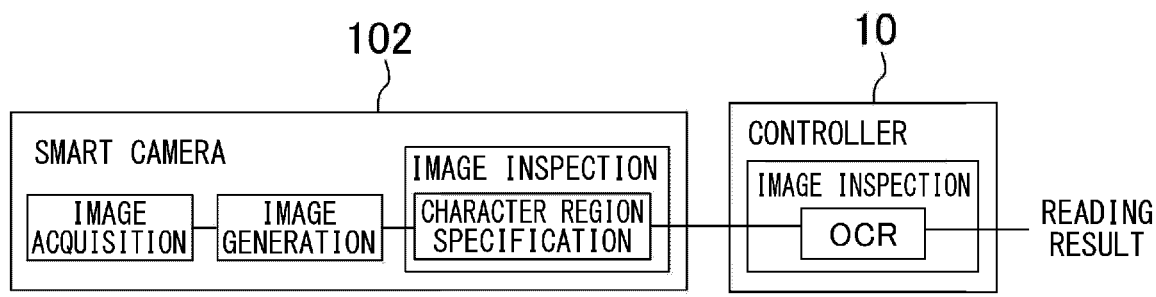

FIGS. 15A and 15B illustrate two operation examples of the image inspection system 1. FIG. 15A of FIG. 15 shows an example of performing an imprint inspection. When the imprint inspection is performed, first, the smart camera 102 images the workpiece a plurality of times to acquire a plurality of images. The plurality of acquired images are combined to generate a shape image. The smart camera 102 transfers the generated shape image to the controller 10. The controller 10 specifies a character region based on the shape image transferred from the smart camera 102, and executes OCR processing (character reading processing) on the specified character region.

The controller 10 outputs the obtained reading result to the outside.

Two smart cameras are used for the imprint inspection and the flaw inspection. First, the workpiece is captured a plurality of times by the smart camera A to acquire a plurality of images. The plurality of acquired images are combined to generate a shape image. The smart camera B also captures the workpiece a plurality of times to acquire a plurality of images, and combines the plurality of acquired images to generate a shape image. Each of the smart camera A and the smart camera B transfers the generated shape image to the controller 10. The controller 10 specifies a character region based on the shape image transferred from the smart camera A, and executes OCR processing on the specified character region. The controller 10 outputs the obtained reading result to the outside. In addition, the controller 10 determines the presence or absence of a flaw based on the shape image transferred from the smart camera B. When it is determined that the reading result of the character is the expected value and it is determined that there is no flaw, the controller 10 determines "good".

FIG. 15B of FIG. 15 shows an example in which the smart camera 102 executes until the character region is specified. The smart camera 102 captures the workpiece a plurality of times to acquire a plurality of images. The plurality of acquired images are combined to generate a shape image. The smart camera 102 specifies a character region based on the generated shape image, and transfers only the specified character region in the shape image to the controller 10. This improves the transfer speed. The controller 10 executes OCR processing on the character region specified by the smart camera 102. The controller 10 outputs the obtained reading result to the outside. Note that the smart camera 102 may perform processing of transferring the shape image to the controller 10 in parallel with the processing of specifying the character region based on the shape image, and then transfer the position information of the specified character region to the controller 10. The controller can perform OCR processing of a character region on the transferred shape image based on the position information. Generally, since the transfer processing of the position information does not take much time as compared with the image transfer processing, the processing time can be shortened also in this case.

The smart camera 102, the normal camera 101, and the controller 10 are used in the case of performing the imprint inspection and the assembly inspection of the different-color component. The smart camera 102 captures the workpiece a plurality of times to acquire a plurality of images. The plurality of acquired images are combined to generate a shape image. The smart camera 102 transfers the generated shape image to the controller 10. The controller 10 specifies a character region based on the shape image transferred from the smart camera 102, and executes OCR processing and calculation of easiness of identification on the specified character region. The controller 10 identifies the type of the workpiece from the OCR processing result, and determines the color of the part to be at a predetermined position in the inspection target image generated by capturing the image of the workpiece with the normal camera 101. The normal camera 101 generates an inspection target image and transfers the inspection target image to the controller 10. The controller 10 determines whether the component of the color is present at a predetermined position in the inspection target image transferred from the normal camera 101. When it is determined that the easiness of identification of the OCR processing is greater than or equal to the threshold and that the component of the color is present at the inspection position of the inspection target image, the controller 10 determines that the result is "good". Here, an example has been described in which the controller 10 executes the OCR processing and the calculation of the easiness of identification on the shape image generated and transferred by the smart camera 102. However, the smart camera 102 may execute the OCR processing and the calculation of the easiness of identification, and transfer the result of the OCR processing and the easiness of identification to the controller 10. In this case, the inspection unit 12 of the controller 10 can determine the final result based on the result of the inspection processing executed on the inspection target image acquired from the normal camera and the result of the inspection processing received from the smart camera.

(Setting Procedure Based on Type Recognition of Connected Camera)

The controller 10 is configured to be capable of recognizing a type of whether the connected camera is the smart camera 102 or the normal camera 101. Signals or information capable of recognizing the type are output from the smart camera 102 and the normal camera 101 to the controller 10. When the camera type specified from the information output from the smart camera 102 and the normal camera 101 is included in the types registered in advance in the controller 10, the camera type is recognized. The number of pixels, availability of color imaging, functions, and the like can be specified based on the model of the camera.

The setting unit 15 is configured to change processing that can be set for the camera according to the recognized type. In the case of the smart camera 102, the processing can be set to the smart camera 102, and in the case of the normal camera 101, the processing can be set to the normal camera 101.

Figure 16:
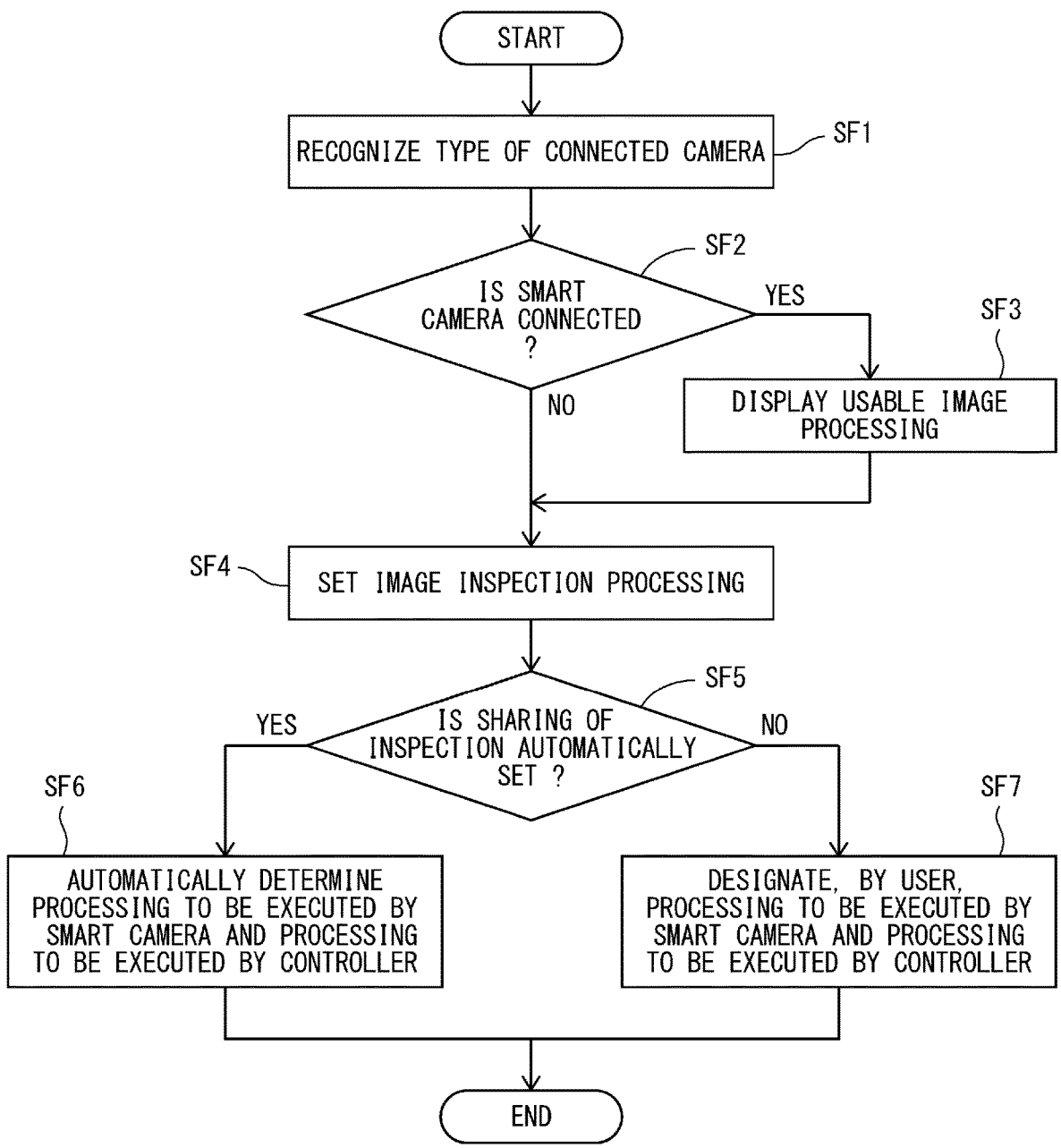
FIG. 16 is a flowchart illustrating an example of a setting procedure based on type recognition of a connected camera.
Figure 17:
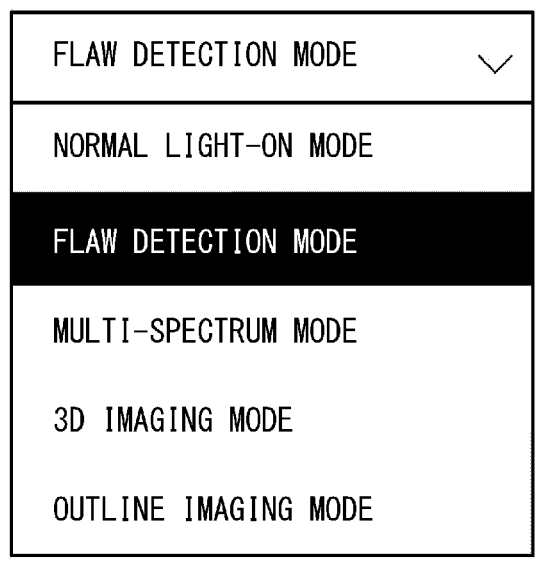
FIG. 17 is a diagram illustrating a display example of image generation processing that can be used in a smart camera.

Hereinafter, a setting procedure based on the type recognition of the connected camera will be specifically described based on the flowchart illustrated in FIG. 16. In step SF1 after the start, the type of the camera connected to the controller 10 is recognized by the above-described method. In step SF2, it is determined whether the smart camera 102 is connected to the controller 10. In a case where the smart camera 102 is connected to the controller 10, the process proceeds to step SF3. In step SF3, the controller 10 causes the display unit 30 to display image generation processing usable by the smart camera 102 connected to the controller 10. FIG. 17 illustrates a display example of usable image generation processing. In this display example, a plurality of image generation processing is displayed in a list format, and a user can select any one image generation processing from among the plurality of image generation processing. In step SF3, the image generation processing selected by the user is specified and temporarily stored.

On the other hand, when the normal camera 101 is connected to the controller 10, the process directly proceeds to step SF4. In step SF4, the image inspection processing that can be executed by both the controller 10 and the smart camera 102 is set.

Thereafter, the process proceeds to step SF5, and it is determined whether the sharing of the image inspection processing is automatically set. The sharing of the image inspection processing means that processing executed by the smart camera 102 and processing executed by the controller 10 are divided in a case where the image inspection processing includes a plurality of processing. This determination is made based on a user's input operation. In a case where the user inputs that the sharing of the image inspection processing is automatically set, the process proceeds to step SF6. On the other hand, in a case where the user inputs that the sharing of the image inspection processing is not automatically set, the process proceeds to step SF7.

In step SF6, the controller 10 automatically determines processing to be executed by the smart camera 102 and processing to be executed by the controller 10. For example, the first half of the image inspection processing is processing executed by the smart camera 102, and the second half of the image inspection processing is processing executed by the controller 10.

In step SF7, the user designates processing to be executed by the smart camera 102 and processing to be executed by the controller 10. Thus, the setting based on the type recognition of the connected camera ends.

Operation and Effect of Embodiment

As described above, for example, when the normal camera 101 and the controller 10 are introduced by adding an inspection line later where only the smart camera 102 is operated, the smart camera 102 can also be connected to the controller 10. Since the first inspection setting of the smart camera 102 is a setting for an image, the first inspection setting can also be used in image inspection using the normal camera 101 and the controller 10. Therefore, by storing the first inspection setting of the smart camera 102 in the storage unit 14 of the controller 10 and using the first inspection setting at the time of image inspection using the normal camera 101 and the controller 10, it is not necessary to recreate the inspection setting on the controller 10 side, and the burden on the user can be reduced.

Further, in the image inspection system 1, a mode in which the smart camera 102 alone executes the generation processing of an inspection target image to the inspection processing, and a mode in which the smart camera 102 executes the generation processing of an inspection target image and the transfer processing of the inspection target image to the controller 10 and the controller 10 executes the inspection process can be selected. That is, in a case where the inspection processing can be performed by the smart camera 102, the inspection processing can be completed by the smart camera 102 alone, and in a case where the processing capability of the smart camera 102 alone is insufficient, the inspection processing can be performed by the controller 10, so that the smart camera 102 and the controller 10 can be cooperated as necessary.

The above-described embodiments are merely examples in all respects, and should not be construed in a limiting manner. Further, all modifications and changes falling within the equivalent scope of the claims are within the scope of the invention.

As described above, the invention can be used as an image inspection system capable of executing various inspections using, for example, an image obtained by imaging a workpiece.

What is claimed is:

1. A controller to which a smart camera is connectable, the controller comprising:
    a setting unit that receives a setting of any one of a first mode in which the smart camera connected to the controller independently executes generation processing of an inspection target image and inspection processing on the inspection target image, and a second mode in which the smart camera connected to the controller executes generation processing of an inspection target image and transfer processing of the inspection target image to the controller, and the controller executes inspection processing on the transferred inspection target image; and
    an inspection unit that executes inspection processing when the setting unit receives a setting of the second mode, and wherein
    the inspection unit executes the inspection processing based on an inspection setting on which the smart camera executes the inspection processing based on the first mode.

2. The controller according to claim 1, wherein the setting unit is configured to further receive a first form of selection in which the inspection unit executes all of the inspection processing on the inspection target image generated by one smart camera connected to the controller and transferred without executing the inspection processing by the smart camera in the second mode.

3. The controller according to claim 1, wherein the setting unit is further configured to receive a second form of selection in which the inspection unit executes all of the inspection processing on a plurality of inspection target images generated by a plurality of smart cameras connected to the controller and transferred without executing the inspection processing by the plurality of smart cameras in the second mode, and the setting unit executes comprehensive determination based on a result of each inspection processing on the plurality of inspection target images.

4. The controller according to claim 1, wherein the setting unit is configured to further receive a third form of selection in which the inspection unit executes a remaining processing of the inspection processing on the inspection target image generated by one smart camera connected to the controller and transferred after a part of the inspection processing is executed by the smart camera in the second mode.

5. The controller according to claim 4, wherein the inspection unit executes the remaining processing of the inspection processing on the transferred inspection target image by using the result of the part of the inspection processing executed and transferred by the one smart camera connected to the controller in the third form of the second mode.

6. The controller according to claim 1, wherein the setting unit is further configured to receive a fourth form of selection in which the inspection unit executes a remaining processing of each inspection processing on a plurality of inspection target images generated by a plurality of smart cameras connected to the controller and transferred after a part of each inspection processing by the plurality of smart cameras in the second mode, and the setting unit executes comprehensive determination based on a result of each inspection processing on the plurality of inspection target images.

7. The controller according to claim 6, wherein in the fourth form of the second mode, the inspection unit executes the remaining processing of each of the inspection processing on the transferred plurality of inspection target images by using each result of the part of each inspection processing executed by the plurality of smart cameras connected to the controller.

8. The controller according to claim 1, wherein the inspection unit acquires an inspection target image, from the smart camera, generated and image processing applied by the smart camera, and executes the inspection processing on the inspection target image after the image processing in the second mode.

9. The controller according to claim 1, wherein the inspection unit acquires a composite image, from the smart camera, generated by combining a plurality of captured images by the smart camera, and executes the inspection processing on the composite image in the second mode.

10. The controller according to claim 1, wherein the inspection unit acquires three-dimensional shape data, from the smart camera, generated by the smart camera based on a plurality of captured images, and executes the inspection processing on the three-dimensional shape data in the second mode.

11. The controller according to claim 1, wherein
    the controller is connectable to a plurality of cameras including a normal camera not equipped with an image inspection function, and
    the inspection unit executes the inspection processing on an inspection target image acquired from the normal camera, and determines a final result based on a result of the inspection processing and a result of the inspection processing by the smart camera received from the smart camera.

12. The controller according to claim 1, wherein
    the controller is connectable to a plurality of cameras including a normal camera not equipped with an image inspection function, and is configured to recognize whether a type of a connected camera is a smart camera or a normal camera, and
    the setting unit is configured to change processing that is settable for the camera according to the recognized type.

* * * * *